United States Patent
Yao et al.

(10) Patent No.: US 12,256,328 B2
(45) Date of Patent: Mar. 18, 2025

(54) POWER CONSUMPTION CONTROL METHOD AND DEVICE

(71) Applicant: Huawei Technologies Co., Ltd., Shenzhen (CN)

(72) Inventors: Hongtao Yao, Shenzhen (CN); Weigang Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 17/775,790

(22) PCT Filed: Oct. 29, 2020

(86) PCT No.: PCT/CN2020/124880
§ 371 (c)(1),
(2) Date: May 10, 2022

(87) PCT Pub. No.: WO2021/093598
PCT Pub. Date: May 20, 2021

(65) Prior Publication Data
US 2022/0394610 A1 Dec. 8, 2022

(30) Foreign Application Priority Data
Nov. 11, 2019 (CN) .......................... 201911096422.2

(51) Int. Cl.
*H04W 52/02* (2009.01)
*H04W 84/12* (2009.01)

(52) U.S. Cl.
CPC ... *H04W 52/0206* (2013.01); *H04W 52/0216* (2013.01); *H04W 84/12* (2013.01)

(58) Field of Classification Search
CPC ......... H04W 52/0206; H04W 52/0216; H04W 84/12; G06F 1/3243; G06F 1/3278; G06F 1/3215; Y02D 30/70
See application file for complete search history.

(56) References Cited

U.S. PATENT DOCUMENTS

2009/0131152 A1* 5/2009 Busse ................ H04N 21/4826 463/23
2013/0021994 A1* 1/2013 Ji .......................... H04L 1/1854 370/329

(Continued)

FOREIGN PATENT DOCUMENTS

| CN | 102156530 A | 8/2011 |
| CN | 102938926 A | 2/2013 |

(Continued)

OTHER PUBLICATIONS

R1-1911343, Huawei et al., "SRS design for NR positioning," 3GPP TSG RAN WG1 Meeting #98bis, Chongqing, China, Oct. 14-20, 2019, 20 pages.

(Continued)

*Primary Examiner* — Tejis Daya
(74) *Attorney, Agent, or Firm* — Conley Rose, P.C.

(57) ABSTRACT

A power consumption control method includes obtaining, by a wireless access device, characteristic data of one or more first components, where the characteristic data indicates a running status of the wireless access device; determining, by the wireless access device, target power consumption statuses of a plurality of second components based on the characteristic data; and adjusting, by the wireless access device, power consumption statuses of the second components based on the target power consumption statuses.

20 Claims, 12 Drawing Sheets

(56) References Cited

U.S. PATENT DOCUMENTS

| | | | |
|---|---|---|---|
| 2013/0114488 A1 | 5/2013 | Fang et al. | |
| 2015/0181641 A1* | 6/2015 | Farajidana | H04W 76/28 |
| | | | 370/311 |
| 2017/0105175 A1 | 4/2017 | Gast | |
| 2017/0308155 A1 | 10/2017 | Lu et al. | |
| 2019/0082392 A1* | 3/2019 | Balasubramanian | ........................ |
| | | | G06F 1/3278 |
| 2022/0150829 A1* | 5/2022 | Yoon | H04W 76/30 |
| 2022/0394610 A1 | 12/2022 | Yao et al. | |
| 2024/0196409 A1* | 6/2024 | Lee | H04W 72/535 |

FOREIGN PATENT DOCUMENTS

| | | | | |
|---|---|---|---|---|
| CN | 104144479 A | 11/2014 | | |
| CN | 104270803 A | 1/2015 | | |
| CN | 104812039 A | 7/2015 | | |
| CN | 105933961 A | 9/2016 | | |
| CN | 106445064 A | 2/2017 | | |
| CN | 108052196 A | 5/2018 | | |
| CN | 108810938 A | 11/2018 | | |
| CN | 111132283 A | 5/2020 | | |
| EP | 1583285 A1 | 10/2005 | | |
| WO | WO-2014000459 A1 * | 1/2014 | ........ H04W 52/0274 | |
| WO | 2016058386 A1 | 4/2016 | | |

OTHER PUBLICATIONS

R2-1913901, Resubmission R2-1911304, Qualcomm Inc et al., "UE Indication on expected data," 3GPP TSG-RAN WG2 Meeting #107bis, Chongqing, China, Oct. 14-18, 2019, 3 pages.

* cited by examiner

POWER CONSUMPTION CONTROL METHOD AND DEVICE

CROSS-REFERENCE TO RELATED APPLICATIONS

This is a U.S. National Stage of International Patent Application No. PCT/CN2020/124880 filed on Oct. 29, 2020, which claims priority to Chinese patent application Ser. No. 20/1911096422.2 filed on Nov. 11, 2019. Both of the aforementioned applications are hereby incorporated by reference in their entireties.

TECHNICAL FIELD

Embodiments of this application relate to the field of electronic technologies, and in particular, to a power consumption control method and a device.

BACKGROUND

With development of mobile communication technologies, popularization of long term evolution (long term evolution, LTE) communication, commercial use of 5G communication, and the like, an increasing quantity of users go online through a mobile communication network by using a wireless access device. Battery life the wireless access device is always a major concern for the users. A wireless access device with a long standby time is increasingly favored by the users. Therefore, reducing power consumption and improving battery life become important research directions of the wireless access device.

SUMMARY

Embodiments of this application provide a power consumption control method and a device, to reduce overall power consumption of an electronic device and prolong a standby time.

To achieve the foregoing objectives, the following technical solutions are used in embodiments of this application.

According to one aspect, an embodiment of this application provides a power consumption control method, including the following: a wireless access device obtains characteristic data of one or more first components, where the characteristic data is used to indicate a running status of the wireless access device. The wireless access device determines target power consumption statuses of a plurality of second components based on the characteristic data. The wireless access device adjusts power consumption statuses of the plurality of second components based on the target power consumption statuses.

In this solution, the wireless access device may collect current characteristic data of an internal component, and the characteristic data may be used to represent a current service scenario of a user. The wireless access device may determine target power consumption statuses of a plurality of components based on the characteristic data used to represent the service scenario, and adjust power consumption statuses of the plurality of components to the target power consumption statuses. Thus, a power consumption status of the wireless access device matches the service scenario in time by coordinately processing of various components, so as to reduce overall power consumption of the wireless access device and prolongs a standby time.

In a possible design, that the wireless access device determines target power consumption statuses of a plurality of second components based on the characteristic data includes the following: The wireless access device identifies a target service scenario based on the characteristic data. The wireless access device determines the target power consumption statuses of the plurality of second components based on the target service scenario.

In this solution, the wireless access device may first determine, based on the characteristic data, a current service scenario of a user, that is, a target service scenario, and then determine target power consumption statuses of a plurality of components corresponding to the target service scenario, so that the target power consumption statuses of the plurality of components correspond to the current service scenario of the user in time.

In another possible design, that the wireless access device determines the target power consumption statuses of the plurality of second components based on the target service scenario includes the following: The wireless access device determines a target power consumption mode based on the target service scenario, where the target power consumption mode corresponds to the target power consumption statuses of the plurality of second components.

That is, the target power consumption mode corresponds to the target power consumption statuses of the plurality of second components. The wireless access device may determine a corresponding target power consumption mode based on a current service scenario of a user, so as to determine the target power consumption statuses of the plurality of second components corresponding to the target power consumption mode.

In another possible design, when the target service scenario is an online video viewing scenario or an online network game scenario, the target power consumption mode is a first power consumption mode. Alternatively, when the target service scenario is a scenario in which a terminal accessing the wireless access device is in a doze mode or a scenario in which a terminal accessing the wireless access device has no communication traffic, the target power consumption mode is a second power consumption mode. Alternatively, when the target service scenario is a scenario in which the wireless access device has no user access, the target power consumption mode is a third power consumption mode.

That is, different target service scenarios may correspond to different target power consumption modes, and the wireless access device may perform corresponding power consumption adjustment based on a specific target service scenario.

In another possible design, that the wireless access device determines target power consumption statuses of a plurality of second components based on the characteristic data includes the following: The wireless access device determines the target power consumption statuses of the plurality of second components, after determining, based on the characteristic data, that a preset condition is met.

In this solution, the wireless access device may determine whether the characteristic data meets the preset condition, and if the characteristic data meets the preset condition, determine a target power consumption status corresponding to the preset condition. That is, the wireless access device may determine, based on whether the characteristic data meets the preset condition, whether to perform power consumption adjustment.

In another possible design, that the wireless access device determines the target power consumption statuses of the plurality of second components, after determining, based on the characteristic data, that a preset condition is met includes the following: The wireless access device determines a target power consumption mode, after determining, based on the characteristic data, that the preset condition is met, where the target power consumption mode corresponds to the target power consumption statuses of the plurality of second components.

In this solution, the wireless access device may first determine the target power consumption mode when the characteristic data meets the preset condition, and then determine a corresponding target power consumption status based on the target power consumption mode.

In another possible design, when the preset condition includes: meeting that Wi-Fi is in a wireless access point AP mode, counting of a Wi-Fi data frame is zero, a screen is off, a universal serial bus USB is not accessed, a group temporal key GTK refresh period does not expire, a quantity of Wi-Fi user access is not zero, and duration exceeds a first preset threshold, or when the preset condition includes: meeting that a screen is off, a USB is not accessed, a GTK refresh period does not expire, a quantity of Wi-Fi user access is zero, and duration exceeds a second preset threshold, the target power consumption mode is a second power consumption mode.

For example, the second power consumption mode may be a light sleep mode. If the characteristic data of the wireless access device meets the foregoing condition, the wireless access device may enter the light sleep mode, so as to save power consumption.

In another possible design, when the preset condition includes: meeting that a screen is off, a USB is not accessed, a GTK refresh period does not expire, a quantity of Wi-Fi user access is zero, and duration exceeds a third preset threshold, the target power consumption mode is a third power consumption mode.

For example, the third power consumption mode may be a deep sleep mode. If the characteristic data of the wireless access device meets the foregoing condition, the wireless access device may enter the deep sleep mode, so as to save more power consumption.

In another possible design, when the preset condition includes at least one of the following: a USB access event, a screen-on event, a Wi-Fi user access event, a receive/transmit data frame event, or a GTK refresh period expires, or when the preset condition includes at least one of the following: Wi-Fi is in a non-AP mode, a screen is on, a USB is accessed, or counting of a Wi-Fi data frame is not zero, the target power consumption mode is a first power consumption mode.

For example, the first power consumption mode may be a normal mode. If the characteristic data of the wireless access device meets the foregoing condition, the wireless access device may enter the normal mode, so as to ensure that a user service can be normally executed.

In another possible design, the plurality of second components include a plurality of components in an APP core, a modem modem core, a Wi-Fi chip, or a peripheral.

In this way, the wireless access device may adjust power consumption of the plurality of components in the APP core, the modem modem core, the Wi-Fi chip, or the peripheral based on the characteristic data, so as to adjust overall power consumption of the wireless access device.

In another possible design, the plurality of second components include an APP core, a modem modem core, and a Wi-Fi chip. Corresponding to the second power consumption mode, a target power consumption status of the APP core is sleep, a target power consumption status of the modem core is discontinuous reception/connection discontinuous reception DRX/CDRX, and a target power consumption status of the Wi-Fi chip is a WoW mode.

This case may correspond to the light sleep mode, and in the light sleep mode, the APP core, the modem modem core, and the Wi-Fi chip may be in a power consumption saving state.

In another possible design, the plurality of second components include an APP core, a modem core, and a Wi-Fi chip. Corresponding to the third power consumption mode, a target power consumption status of the APP core is sleep, a target power consumption status of the modem core is an offline mode, and a target power consumption status of the Wi-Fi chip is power off.

This case may correspond to the deep sleep mode, and in the deep sleep mode, the APP core, the modem modem core, and the Wi-Fi chip may save more power consumption.

In another possible design, the plurality of second components include an APP core, a modem core, and a Wi-Fi chip. Corresponding to the first power consumption mode, a target power consumption status of the APP core is normal working, a target power consumption status of the modem core is normal working, and a target power consumption status of the Wi-Fi chip is normal working.

This case may correspond to the normal mode, and in the normal mode, the APP core, the modem modem core, and the Wi-Fi chip may run with normal performance and power consumption.

In another possible design, the first component is an APP core, a modem core, a Wi-Fi chip, a screen, a key, a USB interface, or a sensor.

That is, the wireless access device may collect characteristic data of a component such as an APP core, a modem core, a Wi-Fi chip, a screen, a key, a USB interface, or a sensor, so as to represent the current service scenario of the user.

In another possible design, the characteristic data includes at least one of the following: a working state, a quantity of access devices, a quantity of receive/transmit data frames, a traffic characteristic, a data packet characteristic, or collected data.

That is, the wireless access device may collect data such as a working status of an internal component, a quantity of access devices, a quantity of receive/transmit data frames, a traffic characteristic, a data packet characteristic, or collected data, to represent the current service scenario of the user.

According to another aspect, an embodiment of this application provides a wireless access device, including one or more processors and a memory, where the memory stores code. When the code is executed by the wireless access device, the wireless access device performs the power consumption control method performed by the electronic device in any possible design of the foregoing aspect.

According to still another aspect, an embodiment of this application provides a power consumption control apparatus, and the apparatus is included in a wireless access device. The apparatus has a function of implementing behavior of the electronic device in any method according to the foregoing aspects and the possible designs. The function may be implemented by hardware, or may be implemented by hardware executing corresponding software. The hardware or the software includes at least one module or unit corresponding to the foregoing function, for example, an obtaining module/unit, a determining module/unit, an adjustment module/unit, and the like.

According to another aspect, an embodiment of this application provides a computer-readable storage medium, including a computer instruction. When the computer instruction runs on an electronic device, the electronic device performs the power consumption control method in any possible design of the foregoing aspect.

According to still another aspect, an embodiment of this application provides a computer program product. When the computer program product runs on a computer, the computer performs the power consumption control method performed by the electronic device in any possible design of the foregoing aspect.

According to another aspect, an embodiment of this application provides a chip system. The chip system is used in an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device is enabled to perform the audio processing method in any possible design of the foregoing aspects.

According to still another aspect, an embodiment of this application provides a communications system, where the communications system includes a wireless access device and a terminal. The terminal may access the wireless access device, to access a network. The wireless access device may perform the power consumption control method in any possible design of the foregoing aspect.

For beneficial effects corresponding to the foregoing other aspects, refer to the descriptions of the beneficial effects in the method aspects. Details are not described herein again.

DESCRIPTION OF EMBODIMENTS

Figure 1:
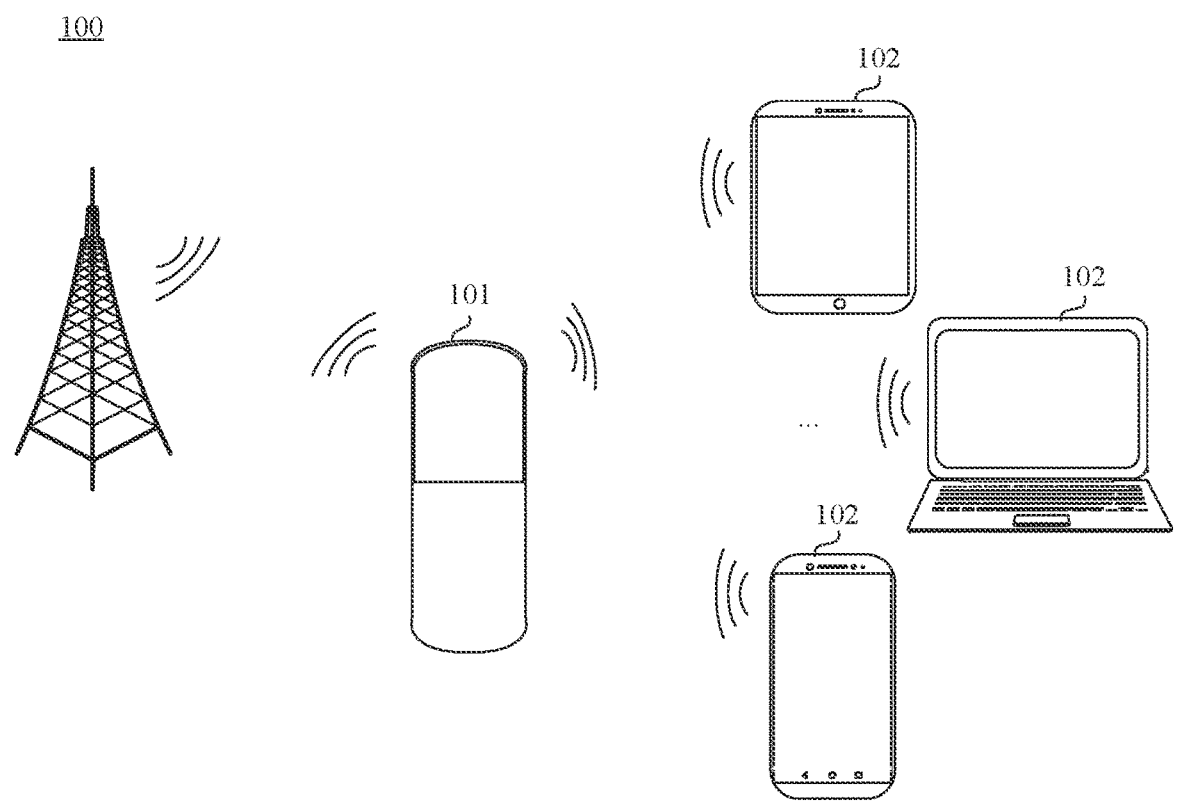
FIG. 1 is a schematic diagram of a structure of a communication system according to an embodiment of this application.

The following describes the technical solutions in embodiments of this application with reference to the accompanying drawings in embodiments of this application. In the descriptions of embodiments of this application, unless otherwise specified, "I" means "or". For example, A/B may represent A or B. In this specification, "and/or" describes only an association between associated objects and represents that three relationships may exist. For example, A and/or B may represent the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more than two.

A wireless access device may access a network based on a first communication technology, and forward, by using a second communication technology, a first communication technology-based network signal, so that a terminal can access the network through a second communication technology-based communication signal. The wireless access device may supply power by a battery, so that a user can carry the wireless access device and use the wireless access device to access the network at any time by using the terminal. This reduces power consumption of the wireless access device, so as to improve of battery life, and prolong working time of the wireless access device.

An example in which a communications technology is Wi-Fi is used for description. In a solution for reducing power consumption of a wireless access device, the wireless access device may detect an access request of a terminal within a period of time of a beacon (Beacon) frame period, and stop detecting an access request of a station within another period of time of the beacon frame period, thereby reducing power consumption of the wireless access device. In this solution, the wireless access device reduces power consumption only from a perspective of detection duration of a beacon frame of a Wi-Fi chip, and a power consumption gain is relatively low. In addition, in this solution, a part of time periods for detecting the access request of the terminal is stopped. This causes an increase in an access delay of the terminal, and further leads to a compatibility problem, for example, some terminals cannot access.

An embodiment of this application provides a power consumption control method, which may be applied to an electronic device. For different scenarios, the electronic device can effectively reduce overall power consumption by coordinating of various components, prolong working time of the electronic device, and improve user experience. That is, the power consumption control method provided in this embodiment of this application is a system-wide all-scenario power consumption control method for the electronic device.

Based on the power consumption control method provided in this embodiment of this application, the electronic device may collect characteristic data such as a status parameter or a characteristic event of each internal component. The characteristic data may be used to represent a current service scenario of a user. The electronic device may adjust a power consumption status of each component of the electronic device based on the characteristic data and a preset power consumption matching policy, so that the power consumption status of each component can be flexibly adjusted with a change of a user service scenario. Therefore, overall power consumption of the electronic device can be effectively adjusted in time by coordinating of various components.

In some embodiments, the electronic device may be any type of device. For example, the electronic device may be a mobile phone, a tablet computer, a wearable device, a vehicle-mounted device, an augmented reality (augmented reality. AR)/a virtual reality (virtual reality, VR) device, a notebook computer, an ultra-mobile personal computer (ultra-mobile personal computer, UMPC), a netbook, or a personal digital assistant (personal digital assistant, PDA). In this way, any type of device can effectively reduce overall power consumption by coordinating of various components for different scenarios, so as to achieve energy saving and environmental protection.

In some other embodiments, the electronic device may be a device powered by a battery. In this way, for different scenarios by coordinating of various components, the device powered by a battery can effectively reduce overall power consumption, prolong a standby time of each of the battery and the device, and improve user experience.

In some other embodiments, the electronic device may be a wireless access device 101 with a battery in a communications system 100 shown in FIG. 1. In this way, for different scenarios by coordinating of various components, the wireless access device 101 can effectively reduce overall power consumption, reduce heat generation of the wireless access device 101, prolong a standby time of each a battery and the wireless access device, and improve user experience.

As shown in FIG. 1, the communications system 100 may include a wireless access device 101 and a station device 102. The wireless access device 101 may access a network based on the first communications technology, and forward, by using the second communications technology, a first communications technology-based network signal, so as to provide a second communications technology-based communications signal, so that the station device 102 can access the network based on the second communications technology-based communications signal. It may also be understood that the wireless access device 101 may convert the first communications technology-based network signal into the second communications technology-based communications signal, so that the terminal may access the network by using the second communications technology-based communications signal.

For example, the first communications technology and the second communications technology may be any two communications technologies in cellular mobile communications, such as 2G/3G/4G/5G, fiber optic communication. Bluetooth (bluetooth, BT), a wireless local area network (wireless local area networks, WLAN) (such as Wi-Fi), Zigbee, frequency modulation (frequency modulation. FM), near field communication (near field communication, NFC), infrared (infrared, IR), general-purpose 2.4G/5G band wireless communications technology, USB communications, or the like. For example, the first communications technology may be a 4G long term evolution (long term evolution, LTE) communications technology or a 5G non-standalone/standalone (non-standalone/standalone. NSA/SA) communications technology, and the second communications technology may be a Wi-Fi communications technology. For still another example, the first communication technology may be a fiber-optic communication technology, and the second communication technology may be a Wi-Fi communication technology. For still another example, the first communication technology may be a cellular mobile communication technology, and the second communication technology may be a universal serial bus (universal serial bus, USB) communication technology.

It may be understood that the first communication technology and the second communication technology may alternatively be other communication technologies that are not listed in this embodiment of this application. A specific type of the communication technology is not limited in this embodiment of this application.

The wireless access device 101 may be a device such as a wireless router, a wireless access point (access point, AP), or a mobile hotspot. For example, the wireless access device 101 may be specifically wireless customer premise equipment (customer premise equipment, CPE) or a Wi-Fi modem. The wireless access device 101 may alternatively be another device that has wireless technology conversion and access functions provided in embodiments of this application, for example, a mobile phone, a tablet computer, a notebook computer, an ultra-mobile personal computer (ultra-mobile personal computer, UMPC), a personal digital assistant (personal digital assistant, PDA), a smartwatch, or an augmented reality (augmented reality, AR)/virtual reality (virtual reality, VR) device.

The station device 102 in the communications system 100 accesses a network by using the wireless access device, and accesses a terminal device of the network by using a second communications technology-based communications signal provided by the wireless access device 101. For example, the station device 102 may be a mobile phone, a tablet, a notebook computer, or a wearable device.

In some other embodiments, the electronic device may be a wireless access device 101 that is powered in a wired manner without a battery in the communications system 100 shown in FIG. 1. In this way, the wireless access device 101 can effectively reduce overall power consumption by coordinating of various components for different scenarios, so as to achieve energy saving and environmental protection.

Figure 2:
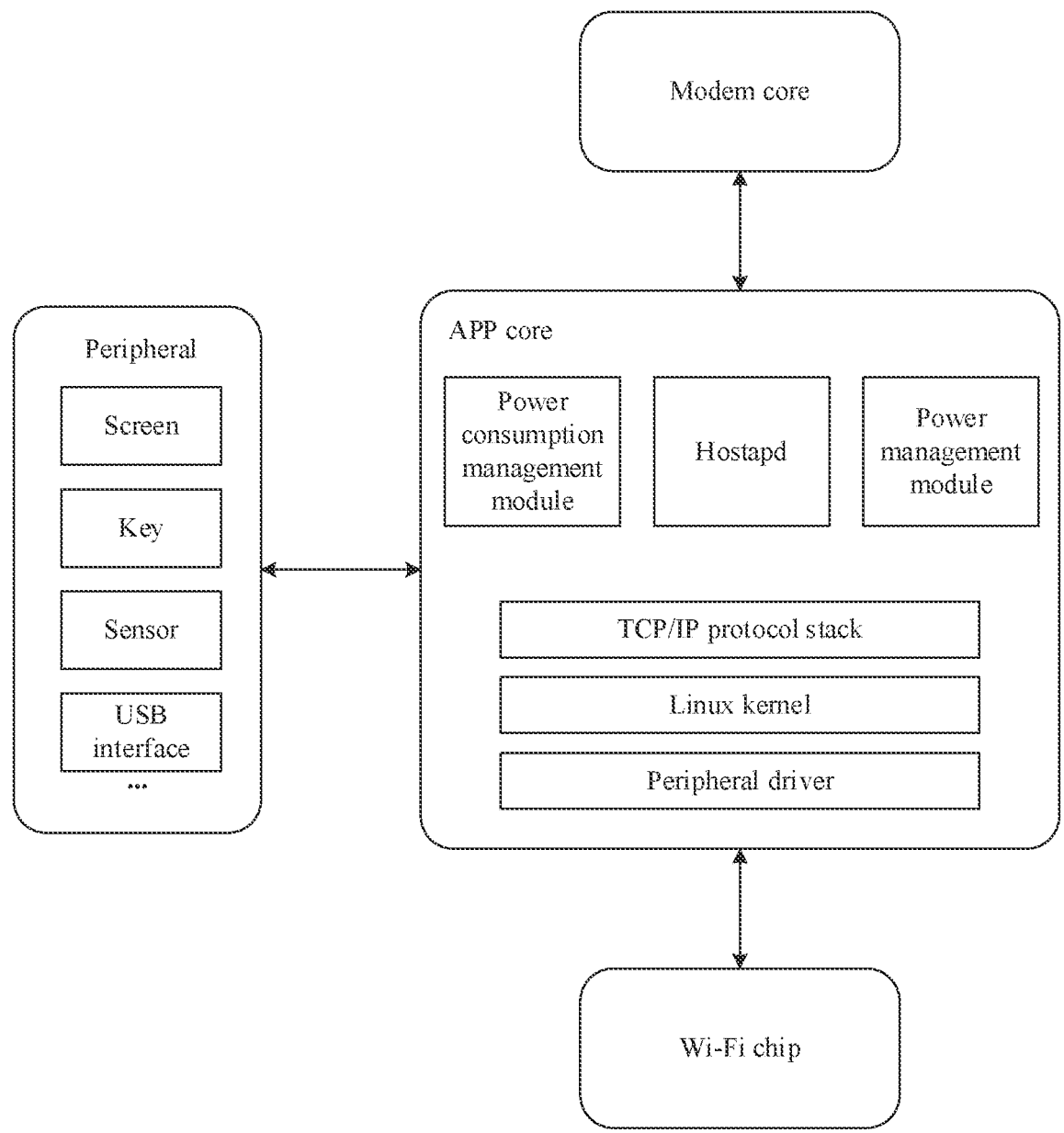
FIG. 2 is a schematic diagram of a structure of a wireless access device according to an embodiment of this application.

For example, when the electronic device is a wireless access device, and the second communications technology is a Wi-Fi communications technology. FIG. 2 shows a schematic diagram of a structure of a wireless access device. As shown in FIG. 2, the wireless access device may include an application (application, APP) core (core), a Wi-Fi chip, and a peripheral. When the wireless access device is a type of mobile broadband device, the first communications technology may be cellular mobile communications. The wireless access device may be configured to convert a cellular mobile signal into another communications signal. As shown in FIG. 2, the wireless access device may further include a modem (Modem) core. The APP core, the Wi-Fi chip, and the modem core may be independent chips, but may share components such as some memories. Alternatively, a plurality of modules in the application core, the modem core, and the Wi-Fi chip may be different modules integrated on a same chip.

The modem core may be configured to implement 2G/3G/4G/5G cellular mobile communications, and may perform, by using an AT (Attention) command (that is, a modem command language), query and configuration management, such as, triggering a network search, querying a network speed, and querying cell signal strength.

The Wi-Fi chip may be configured to send and receive a Wi-Fi frame. Some Wi-Fi chips may further automatically send a beacon frame, a probe response (Probe Response) frame, or the like.

The peripheral may include one or more of a screen, a key (key), a sensor, a USB interface, a network interface, or the like. The screen may include a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light-emitting diodes, QLED), or the like.

The sensor may include a plurality of sensor components such as an electromagnetic specific absorption rate (specific absorption rate, SAR) sensor, an acceleration sensor, a temperature sensor, and a touch sensor. For example, the SAR sensor may be configured to detect signal radiation intensity, to determine whether the radiation intensity is harmful to a human body. The acceleration sensor may detect a moving speed of the wireless access device, to determine that a current service scenario is a high-speed moving scenario such as a high-speed railway or a vehicle.

The USB interface is an interface that conforms to a USB standard specification, and may be specifically a mini USB interface, a micro USB interface, a USB type-C interface, or the like. The USB interface may be configured to connect to a charger to charge the wireless access device, may be configured for the wireless access device to charge another device, or may be configured for the wireless access device to connect to another device and transmit data. For example, the wireless access device may convert another communications technology-based network signal into a USB communications signal. The wireless access device may be connected to a notebook computer through the USB interface, so that the notebook computer can access a network by using a wired communications signal based on the USB interface.

It may be understood that the structure shown in this embodiment of this application does not constitute a specific limitation on the wireless access device. In some another embodiments of this application, the wireless access device may include more or fewer components than those shown in the figure, or some components are combined, or some components are split, or there is a different component layout. The components shown in the figure may be implemented by hardware, software, or a combination of software and hardware. When the electronic device is another wireless access device, the electronic device may also have different components or structures.

In the structure shown in FIG. 2, the APP core may include a power consumption management module, a hostapd, a power management module, a transmission control protocol/internet protocol (transmission control protocol/internet protocol, TCP/IP) protocol stack, a Linux kernel, a peripheral driver, and the like. The APP core runs on the Linux kernel. After the APP is started, the peripheral driver is loaded. The APP may be configured to implement functions such as route forwarding, power consumption control, Wi-Fi configuration management, security management, and power management. The hostapd is a guard process that is in a user mode and that is used for an AP and an authentication server, and may be used to implement related access management and authentication of a wireless local area network.

Figure 3:
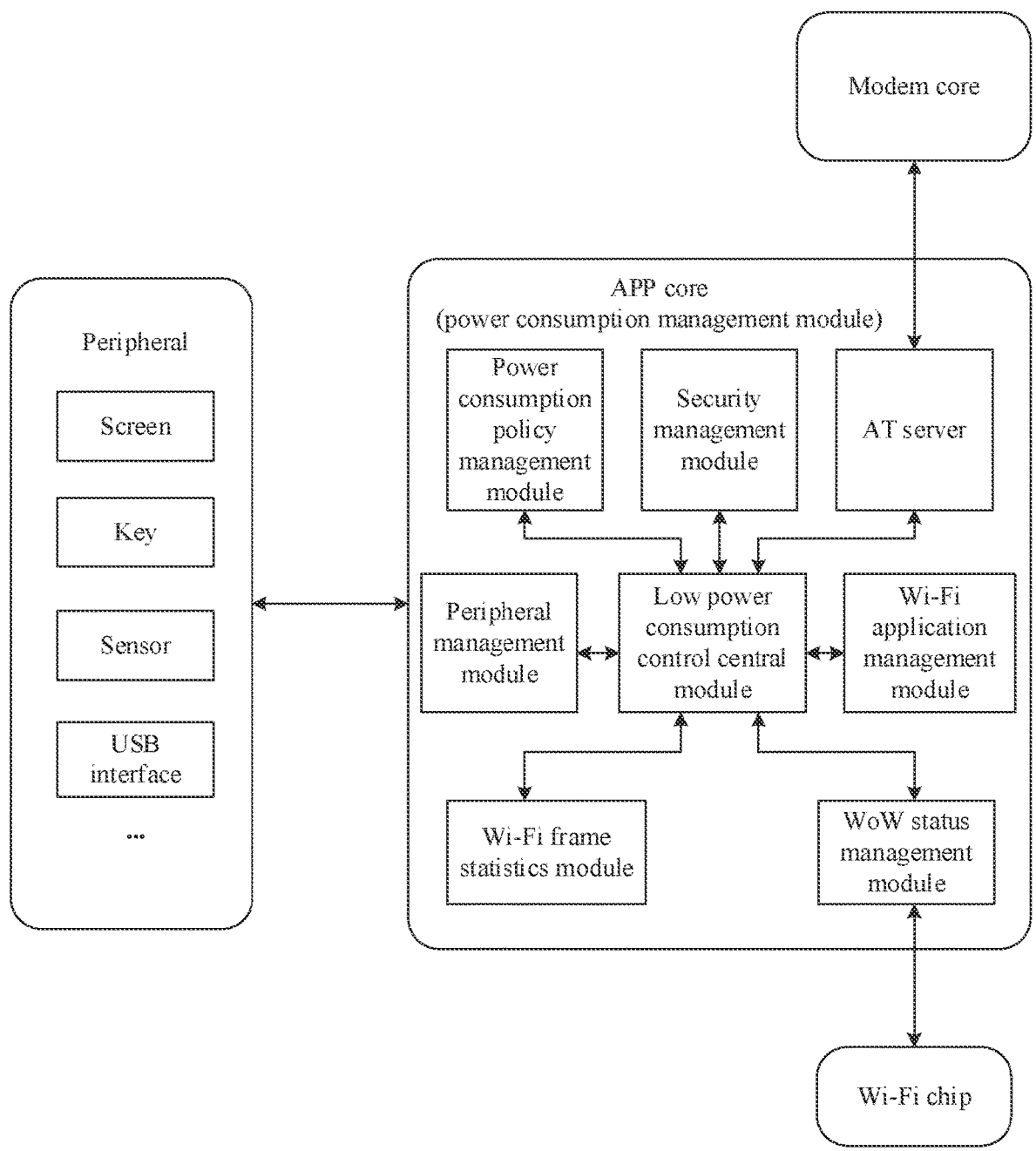
FIG. 3 is a schematic diagram of a structure of another wireless access device according to an embodiment of this application.

For a schematic diagram of a power consumption management module of the wireless access device, refer to FIG. 3. As shown in FIG. 3, the power consumption management module may include a low power consumption control central module, a Wi-Fi application management module, a security management module, a peripheral management module, a Wi-Fi frame statistics module, a wake on wireless local area network (wake on WLAN, WoW) status management module, an AT server, a power consumption policy management module, and the like.

The low power consumption control central module may be configured to: count a status parameter or characteristic data such as a characteristic event of each component in a system, and flexibly control a power consumption status of each component with reference to a current service scenario, so as to implement dynamic adjustment of an overall power consumption status with the service scenario.

The Wi-Fi application management module may be configured to perform Wi-Fi application management, including Wi-Fi operation mode query and switching, Wi-Fi user access quantity management, and the like.

The security management module may be configured to be responsible for overall security policy control, group temporal key (group transient key, GTK) refreshing, cache pairwise master key (pairwise master key. PM key) updating, a firewall, and the like.

The peripheral management module may be configured to configure and manage peripherals by using a driver, including screen on/off management, key management, Wi-Fi chip power-on/off management, sensor management, USB management, and the like.

The Wi-Fi frame statistics module may be configured to count a quantity of data frames, control frames, or management frames between the wireless access device and the terminal.

The WoW status management module switches a manager for each power consumption mode of the Wi-Fi chip, and provides status query for the Wi-Fi chip.

The AT server may be configured to provide an API interface of the modem core, control the modem core to enter different statuses, and query a current status of the modem core.

The power consumption policy management module may be configured to support predefining a power consumption control policy rule based on a service scenario, including matching a service scenario based on collected characteristic data of each component, and matching, based on the service scenario, a power consumption status of each component that is to be adjusted.

It may be understood that each module in the power consumption management module shown in FIG. 3 may be implemented by using hardware, software, or a combination of software and hardware, which is not limited in this embodiment of this application.

Based on the power consumption management module shown in FIG. 3, the wireless access device in this embodiment of this application has at least the following functions:

(1) Hardware capability abstraction. The wireless access device abstracts capabilities of different hardware in the entire system, and performs configuration management by using a same template. In an existing wireless access device, each hardware runs independently, and power consumption management cannot be performed on various hardware together. The power consumption management module provided in this embodiment of this application abstracts capabilities of all hardware and manages the capabilities by using a same template. This can facilitate a software module to manage parameters or statuses of all the hardware together based on the abstracted same template, thereby implementing power consumption adjustment of all the hardware together. In addition, abstracting the capabilities of all hardware and managing the capabilities by using the same template can facilitate combining different capabilities of all the hardware. Further, combinations of different capabilities correspond to different refined service scenarios, so that the power consumption management module performs finely and flexibly power consumption control for different service scenarios.

For example, for a same template obtained after abstraction processing is performed on capabilities of the APP core, the modem core, and the Wi-Fi chip, refer to Table 1.

TABLE 1

| Hardware | Abstract capability |
| --- | --- |
| APP core | Working normally; and sleep |
| Modem core | Working normally; DRX/CDRX; and an offline mode |
| Wi-Fi chip | Working normally; a WoW mode; and power off |

For example, an abstract capability of the APP core, the modem core, and the Wi-Fi chip includes "working normally", but specific situations in which the APP core, the modem core, and the Wi-Fi chip work normally are different. An abstract capability of the APP core includes "working normally", but specific situations in which APP cores provided by different manufacturers work normally are different.

(2) Coordinating of modules in the system. Each module in the power consumption management module mainly implements a function of each component in the entire system, to support normal working of the system Each module interconnects with the low power consumption control central module, reports a status parameter of each component to the low power consumption control central module, and supports the low power consumption control central module to adjust a power consumption status of each component in the system.

(3) Finely scenario control. There are many working scenarios of the wireless access device. First, the power consumption management module may collect characteristic data of each component, for example, a traffic characteristic (such as a receive/transmit frequency of a data frame), a data packet characteristic, a quantity of access devices, statistical information and a status of the modem, a status parameter of each component, or sensor data. The power consumption management module may analyze and process the collected characteristic data, and identify a finely divided user service scenario with reference to a preset power consumption control policy rule. For example, a terminal performs high-speed download after accessing the wireless access device; a terminal is in a standby state after accessing the wireless access device; the wireless access device waits for a terminal to access; the wireless access device has no access for a long time; a user accesses the Internet after accessing the wireless access device on a high-speed railway; or a terminal has no communication traffic after accessing the wireless access device.

Then, the power consumption management module may adjust a power consumption status of each component for a service scenario, so as to accurately match a current service scenario, so that power consumption of each component and overall power consumption can match the current service scenario, thereby avoiding excessive power consumption.

Based on the power consumption management module shown in FIG. 3, the low power consumption control central module may collect statistics on characteristic data such as a status parameter or a characteristic event of each component of the wireless access device by using a module such as the power consumption policy management module, the AT server or the WoW status management module. The characteristic data may be used to represent a current service scenario of a user. The low power consumption control central module may determine a target power consumption status based on the characteristic data of each component and the preset power consumption control policy rule. The low power consumption control central module may further control, by using a module such as the power consumption policy management module, the AT server module, or the WoW status management module, a power consumption status of a component such as the APP core, the modem core, or the Wi-Fi chip to be consistent with a target power consumption status. Thus, a power consumption status of each component can be flexibly adjusted based on a change of a user service scenario, so that power consumption of each component and overall power consumption can match a current service scenario. Thus, overall power consumption of the wireless access device can be effectively adjusted in time by coordinating of various components, so as to avoid excessive power consumption.

Figure 4:
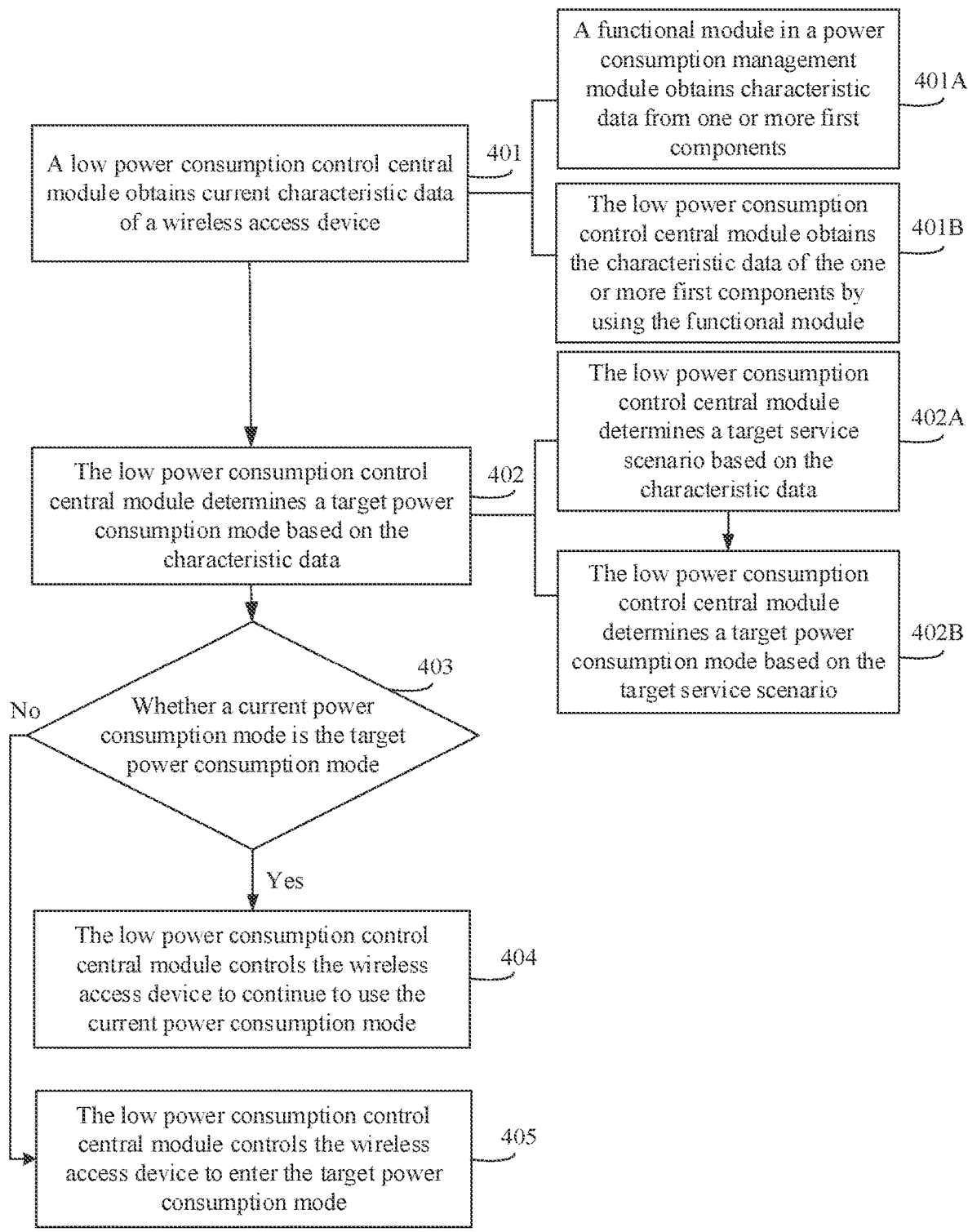
FIG. 4 is a flowchart of a power consumption control method according to an embodiment of this application.

The following describes a power consumption control method provided in an embodiment of this application by using an example in which an electronic device is a wireless access device having the structures shown in FIG. 2 and FIG. 3, and the wireless access device is configured to convert a cellular mobile network signal into a Wi-Fi signal, so that a terminal accesses a network by using the Wi-Fi signal. It may be understood that an operation performed or a function implemented by each component of the wireless access device is equivalent to an operation performed or a function implemented by the wireless access device. Refer to FIG. 4. The method may include the following steps.

401. A low power consumption control central module obtains current characteristic data of a wireless access device.

The current characteristic data of the wireless access device may be used to describe a running status and a working status of the wireless access device. The low power consumption control central module may collect and collect statistics on the characteristic data of the wireless access device, so as to perform power consumption control subsequently based on the current characteristic data.

In some embodiments, the wireless access device may obtain characteristic data of one or more first components in the wireless access device, so as to indicate a current running status and working status of the wireless access device by using the characteristic data of the first component.

The characteristic data of the first component may be used to describe a current status and running status of the first component. The first component may be any component of the wireless access device. For example, the one or more first components in the wireless access device may include an APP core, a modem core, a Wi-Fi chip, a peripheral such as a screen, a USB interface, or a sensor, and another unlisted component. The low power consumption control central module may obtain current characteristic data of a component such as the APP core, the modem core, the Wi-Fi chip, or the peripheral.

The current characteristic data of the first component may include a current status parameter, a generated characteristic event, and the like of the first component. For example, the characteristic data may include a traffic characteristic of communication data, a characteristic of a communication data packet, a working status of the APP core, a working status of the modem core, a working status of the Wi-Fi chip, a screen on/off status, a USB on/off status, a sensor on/off status, a status in which a GTK refresh period does not expire, a quantity of Wi-Fi access devices, a quantity of receive/transmit data frames of the Wi-Fi chip, statistical information of the modem core, data collected by the sensor, a Wi-Fi user access event, a screen on/off event, a USB on/off event, a GTK refresh period expired event, or the like.

The low power consumption control central module may specifically obtain the characteristic data of the first component by using a functional module in a power consumption management module. Another module in the power consumption management module except the low power consumption control central module may be referred to as a functional module.

The low power consumption control central module may separately obtain characteristic data corresponding to the modem core by using an AT server module; obtain characteristic data corresponding to the Wi-Fi chip by using a WoW status management module, a Wi-Fi application management module, and a Wi-Fi frame statistics module; obtain characteristic data corresponding to the APP core by using a power consumption policy management module and a security management module; and obtain characteristic data corresponding to the peripheral by using a peripheral management module.

In some embodiments, referring to FIG. 4, step 401 may include step 401A and step 401B. For a process in which the low power consumption control central module obtains the characteristic data of the first component, refer to FIG. 5.

401A. A functional module in a power consumption management module obtains characteristic data from one or more first components.

The AT server module in the power consumption management module may obtain, from the modem core, the characteristic data corresponding to the modem core. For example, the characteristic data includes a traffic characteristic of communication data of the modem core.

The WoW status management module, the Wi-Fi application management module, and the Wi-Fi frame statistics module in the power consumption management module may obtain the characteristic data corresponding to the Wi-Fi chip from the Wi-Fi chip. For example, the characteristic data includes a quantity of receive/transmit data frames of the Wi-Fi chip.

The power consumption policy management module and the security management module in the power consumption management module may obtain the characteristic data corresponding to the APP core from the APP core. For example, the characteristic data includes an expiration time of user link survivability and the GTK refresh period.

The peripheral management module in the power consumption management module may obtain the characteristic data corresponding to the peripheral from the peripheral. For example, the characteristic data includes a USB insertion event.

401B. The low power consumption control central module obtains the characteristic data of the one or more first components by using the functional module.

The low power consumption control central module may separately obtain the characteristic data of the first component from each functional module. There may be many specific manners in which the low power consumption control central module obtains the characteristic data. For example, the low power consumption control central module periodically queries the characteristic data of the first component from the functional module. The functional module periodically queries the characteristic data of the first component from the first component. Alternatively, the first component periodically reports the characteristic data of the first component to the functional module. The functional module periodically reports the characteristic data of the first component to the low power consumption control central module. Alternatively, after detecting a trigger event, the first component reports the characteristic data of the first component to the functional module. After receiving the trigger event (for example, an operation performed by a user by pressing a preset key), the low power consumption control central module queries the characteristic data of the first component from the functional module.

After obtaining the current characteristic data of the wireless access device in step 401, the low power consumption control central module may determine a target power consumption status of the wireless access device based on the current characteristic data, so as to adjust a power consumption status of the wireless access device in time, thereby avoiding excessive power consumption generated by the wireless access device.

In some embodiments, the low power consumption control central module may determine a target power consumption mode in time based on the current characteristic data, and control the wireless access device to enter the target power consumption mode, that is, control the wireless access device to enter a target power consumption status corresponding to the target power consumption mode.

In some technical solutions, a power consumption control policy rule is preset in the wireless access device, and the power consumption control policy rule includes a first correspondence. For example, the first correspondence may be preset in the low power consumption control central module or the power consumption policy management module. The first correspondence includes a correspondence between a preset condition and a target power consumption mode, and the preset condition may include characteristic data such as a status parameter or a characteristic event. The first correspondence may also be referred to as a matching rule between characteristic data and a target power consumption mode, or a transfer rule between different power consumption modes. For example, for the first correspondence, refer to Table 2.

TABLE 2

First correspondence

| Target power consumption mode | Preset condition | |
|---|---|---|
| | Characteristic data (a status parameter or a characteristic event) | Trigger condition |
| Light sleep mode | Wi-Fi is in an AP mode, counting of a Wi-Fi data frame is zero, a screen is off, a USB is not accessed, a GTK refresh period does not expire, and a quantity of Wi-Fi user access is not zero | All characteristics are met and duration exceeds 10 s |
| Light sleep mode | A screen is off, a USB is not accessed, a GTK refresh period does not expire, and a quantity of Wi-Fi user access is zero | All characteristics are met and duration exceeds 30 s |
| Deep sleep mode | A screen is off, a USB is not accessed, a GTK refresh period does not expire, and a quantity of Wi-Fi user access is zero | All characteristics are met and duration exceeds 600 s |
| Normal mode | A USB access event, a screen-on event, a Wi-Fi user access event, a receive/transmit data frame event, or a GTK refresh period expires | If any event occurs, switch to the normal mode |
| Normal mode | Wi-Fi is in a non-AP mode, a screen is on, a USB is accessed, or counting of a Wi-Fi data frame is not zero | If any state exists, maintain the normal mode and do not switch to another power consumption mode |

Based on the first correspondence, after step 401, the method may further include:

402. The low power consumption control central module determines a target power consumption mode based on the characteristic data.

A correspondence between a preset condition and a target power consumption mode may be preset in the wireless access device. The low power consumption control central module may determine in time, based on the current characteristic data of the wireless access device, whether the preset condition is met, so as to determine a corresponding target power consumption mode when the preset condition is met, so that the low power consumption control central module controls the wireless access device to enter the target power consumption mode, thereby avoiding excessive power consumption.

Characteristic data in the first correspondence may be used to represent a service scenario in which a user currently uses the wireless access device, that is, the target service scenario. The low power consumption control central module may determine the corresponding target power consumption mode in time based on the current characteristic data of the wireless access device, that is, determine the corresponding target power consumption mode in time based on the target service scenario represented by the current characteristic data.

A case shown in Table 2 is used as an example for description. If the low power consumption control central module determines that the following is met: Wi-Fi is in an AP mode, counting of a Wi-Fi receive/transmit data frame is zero, a screen is off, a USB is not accessed, a GTK refresh period does not expire, a quantity of Wi-Fi user access is not zero, and duration exceeds a first preset threshold (for example, may be 10s, 13s, or the like), it may indicate that there is a Wi-Fi user access currently, but the Wi-Fi user does not access a network. Thus, the wireless access device can enter the light sleep mode, so as to be woken up in time without generating excessive power consumption when the Wi-Fi user accesses the network.

The wireless access device may include an AP mode and a non-AP mode. The AP mode is an access point mode, and may be used to connect a terminal to a network. The non-AP mode may include a client mode (also referred to as a master-slave mode), a relay mode, or the like.

If the low power consumption control central module determines that the following is met: a screen is off, a USB is not accessed, a GTK refresh period does not expire, a quantity of Wi-Fi user access is zero, and duration exceeds a second preset threshold (for example, may be 30s, 40s, or the like), it may indicate that there may be no Wi-Fi user access for a short time. Thus, the wireless access device can enter the light sleep mode, so as to be woken up in time without generating excessive power consumption when there is a Wi-Fi user access. Usually, the second preset threshold may be greater than the first preset threshold.

If the low power consumption control central module determines that the following is met: a screen is off, a USB is not accessed, a GTK refresh period does not expire, a quantity of Wi-Fi user access is zero, and duration exceeds a third preset threshold (for example, may be 600s, 700s, or the like), it may indicate that there is no Wi-Fi user access for a relatively long time. Thus, the wireless access device can enter the deep sleep mode, so as to save more power consumption. Usually, the third preset threshold may be greater than the first preset threshold, and also greater than the second preset threshold.

If the low power consumption control central module determines that at least one of the following events is generated: a USB access event, a screen-on event, a user access event, a receive/transmit data frame event, or a GTK refresh period expires, the low power consumption control central module may control the wireless access device to enter the normal mode, so as to ensure that USB access, a screen, Wi-Fi user access, a receive/transmit data frame, or GTK refresh is normally performed.

For example, if the USB access event is generated, it may indicate that the wireless access device is connected to the terminal by using a USB. A user may exchange data with the wireless access device by using the terminal through a USB interface, so as to access the network. The wireless access device may enter the normal mode, so as to ensure that data transmission with the terminal can be normally performed.

If the low power consumption control central module determines that at least one of the following statuses exists: Wi-Fi is in a non-AP mode, a screen is on, a USB is accessed, or counting of a Wi-Fi data frame is not zero, the low power consumption control central module may control the wireless access device to maintain the normal mode, so as to ensure that the non-AP mode of Wi-Fi, the screen is on, the USB is accessed, data frame receiving/transmitting, or the like can be normally performed.

That is, when determining that the characteristic data meets the preset condition shown in Table 2, the low power consumption control central module may adjust the component of the wireless access device to enter the target power consumption mode corresponding to the preset condition.

In other technical solutions, the first correspondence may alternatively be a correspondence between a preset condition, a service scenario, and a target power consumption mode.

In some other technical solutions, the preset power consumption control policy rule in the wireless access device includes a second correspondence. For example, the second correspondence may be preset in the low power consumption control central module or the power consumption policy management module. The second correspondence includes a correspondence between a service scenario and a target power consumption mode. For example, for the second correspondence, refer to Table 3.

TABLE 3

Second correspondence

| Target power consumption mode | Service scenario |
|---|---|
| Normal mode | Online video/live broadcast viewing scenario; or a video call scenario; or a network game scenario; or a high-speed download scenario; or a scenario of terminal access through a USB |
| Light sleep mode | A scenario in which an accessed terminal has no communication traffic; or a scenario in which a terminal is in a doze mode |
| Deep sleep mode | Scenario of no user access |

Based on the second correspondence, step 402 may be replaced with step 402A and step 402B.

402A. The low power consumption control central module determines a target service scenario based on the characteristic data.

The target service scenario is a current service scenario in which a user uses the wireless access device. For example, the service scenario in which the user currently uses the wireless access device may be the service scenario shown in Table 3.

The low power consumption control central module may analyze obtained characteristic data of the wireless access device, so as to identify a currently corresponding target service scenario. Different characteristic data may represent different service scenarios. The low power consumption control central module may finely distinguish the different service scenarios based on the different characteristic data.

For example, the Wi-Fi frame statistics module counts, in each time period T1 (for example, 1s), whether a quantity of receive/transmit data frames of the Wi-Fi chip is zero. If the low power consumption control central module learns about, based on the characteristic data, that in a preset threshold 1 (for example, 30s), a quantity of time periods in which a quantity of receive/transmit data frames of the Wi-Fi chip is zero is less than a preset value 1 (for example, 5%), the low power consumption control central module determines that a current target service scenario is a large-traffic service scenario such as online video/live broadcast viewing, a video call, a network game scenario, or a high-speed download.

As another example, the characteristic data may include a characteristic of a data packet interacted with the wireless access device. For example, a characteristic of communication data is analyzed by using a deep packet detection technology, and information about an APP running on a currently accessed terminal is identified. The low power consumption control central module may determine, based on the APP information, that a user currently uses a short video social software by using the terminal, so it may currently be an online video/live broadcast viewing service scenario.

As another example, when a terminal (for example, a mobile phone) that accesses the wireless access device by using Wi-Fi is in a doze mode, the terminal intermittently transmits a data frame to the wireless access device, and a transmission interval increases with time. When the low power consumption control central module determines, based on the characteristic data, that a data frame is received intermittently from the terminal, and a receiving interval increases with time, it may be determined that a current target service scenario is a scenario in which the terminal is in the doze mode.

As another example, the low power consumption control central module may determine, based on the characteristic data, that a current target service scenario is a scenario in which a terminal accessing the wireless access device has no communication traffic. A user may access the wireless access device by using a terminal. After accessing the wireless access device, the terminal may perform communication intermittently. A scenario corresponding to a communication interval may be referred to as a scenario in which there is no communication traffic. For example, the scenario in which there is no communication traffic may include: a scenario corresponding to a refresh interval of an e-book when a user reads the e-book by using a terminal; a scenario corresponding to a refresh interval of a news application when a user enables the news application by using a terminal; a scenario corresponding to a period in which a screen of a terminal is on and no traffic is transmitted; or a scenario corresponding to a period in which a screen of a terminal is off and no traffic is transmitted.

As another example, if the low power consumption control central module learns about, based on the characteristic data, that no terminal currently accesses the wireless access device through Wi-Fi, a USB, or in another manner, and duration of no terminal access is greater than or equal to a fourth preset threshold (for example, 10 min), the low power consumption control central module determines that a current target service scenario is a scenario of no user access.

It may be understood that there may be a plurality of other refined target service scenarios identified by the low power consumption control central module based on the characteristic data, for example, a scenario in which a terminal is in a standby mode after accessing the wireless access device, the wireless access device waits for terminal access, the wireless access device has no access for a long time, a terminal has no communication traffic after accessing the wireless access device, or a user accesses the Internet after accessing the wireless access device on a high-speed mobile device such as a high-speed railway.

For example, if the low power consumption control central module identifies, based on the characteristic data, a current scenario in which a user accesses the Internet after accessing the wireless access device on a high-speed mobile device such as a high-speed railway, a corresponding target power consumption mode is the normal mode. In a case of high-speed moving, the wireless access device needs to frequently switch to a different mobile base station, so the wireless access device needs to have relatively high performance and relatively large power consumption. Therefore, regardless of a data amount exchanged between the wireless access device and a terminal, the wireless access device enters the normal mode, so as to ensure that the user can access the Internet normally.

402B. The low power consumption control central module determines a target power consumption mode based on the target service scenario.

The low power consumption control central module may determine, based on the second correspondence, a target power consumption mode corresponding to a current target service scenario, so that a power consumption status of the wireless access device is adjusted in time based on the target power consumption mode.

For example, if a target service scenario is a large-traffic service scenario such as online video/live broadcast viewing, a video call, a network game scenario, or a high-speed download, a target power consumption mode is the normal mode, so that a user can normally access a network in the large-traffic service scenario.

As another example, if a target service scenario is a scenario in which a terminal (for example, a terminal used by a Wi-Fi access user or a USB access user) accessing the wireless access device has no communication traffic, a target power consumption mode is the light sleep mode, so as to ensure that power consumption is reduced as much as possible when communication can be woken up at any time. For example, the target service scenario may include: a scenario corresponding to a refresh interval of an e-book when a user reads the e-book by using a terminal; a scenario corresponding to a refresh interval of a news application when a user enables the news application by using a terminal; a scenario corresponding to a period in which a screen of a terminal is on and no traffic is transmitted; or a scenario corresponding to a period in which a screen of a terminal is off and no traffic is transmitted.

As another example, if a target service scenario is a scenario of no user access, a target power consumption mode may be the deep sleep mode, so that the wireless access device can save more power consumption.

In some other technical solutions, the second correspondence may alternatively be a correspondence between characteristic data, a service scenario, and a target power consumption mode.

After the low power consumption control central module determines the target power consumption mode, the method may further include step 403 to step 405:

403. The low power consumption control central module determines whether a current power consumption mode is the target power consumption mode.

404. If the current power consumption mode is the target power consumption mode, the low power consumption control central module controls the wireless access device to continue to use the current power consumption mode.

If the current power consumption mode is the target power consumption mode, the power consumption mode and a power consumption status of the wireless access device do not need to be adjusted, and the wireless access device may continue to run in the current power consumption mode and the power consumption status.

405. If the current power consumption mode is not the target power consumption mode, the low power consumption control central module controls the wireless access device to enter the target power consumption mode.

If the current power consumption mode is not the target power consumption mode, the power consumption mode and a power consumption status of the wireless access device need to be adjusted. The low power consumption control central module controls each component of the wireless access device to enter the target power consumption mode, so that the adjusted power consumption mode of the wireless access device matches in time current characteristic data or a service scenario corresponding to the current characteristic data. Thus, the power consumption status of the wireless access device can be flexibly adjusted based on a refined service scenario, so as to avoid excessive power consumption, prolong a standby time, and achieve energy saving and environmental protection.

For example, the low power consumption control central module may control a plurality of second components in the wireless access device to enter the target power consumption mode. The second component is a component that is of the wireless access device and on which power consumption adjustment can be performed. For example, the plurality of second components may include an APP core, a modem core, a Wi-Fi chip, and the like. The low power consumption control central module may control the APP core, the modem core, the Wi-Fi chip, and the like to enter the target power consumption mode. As another example, the plurality of second components include an APP core and a modem core. The low power consumption control central module may control the APP core and the modem core to enter the target power consumption mode. As another example, the plurality of second components include an APP core and a Wi-Fi chip. Alternatively, the plurality of second components include a modem core and a Wi-Fi chip. The second component and the first component may be the same or different. The following embodiment is described by using an example in which the plurality of second components include an APP core, a modem core, and a Wi-Fi chip.

In some embodiments, the preset power consumption control policy rule in the wireless access device includes a third correspondence. The third correspondence includes a correspondence between a target power consumption mode and a power consumption status of the second component. For example, for the third correspondence, refer to Table 4.

TABLE 4

| Third correspondence | | | |
| --- | --- | --- | --- |
| Target power consumption mode | Power consumption status | | |
| | APP core | Modem core | Wi-Fi chip |
| Normal mode | working normally | working 10 normally | working normally |
| Light sleep mode | Sleep | DRX/CDRX | WoW mode |
| Deep sleep mode | Sleep | Airplane mode | Power off |

The WoW mode is a low power consumption mode of the Wi-Fi chip. In this mode, the Wi-Fi chip supports sending a beacon frame, responds when a probe request (Probe request) frame is received, and responds when a null data frame is received. If a received destination address is a management frame and a data frame of the wireless access device, or a control frame of a non-response frame, or if a radar in a specific frequency band is detected, the WoW mode is exited, and the APP core is woken up to perform correlation processing.

Figure 6:
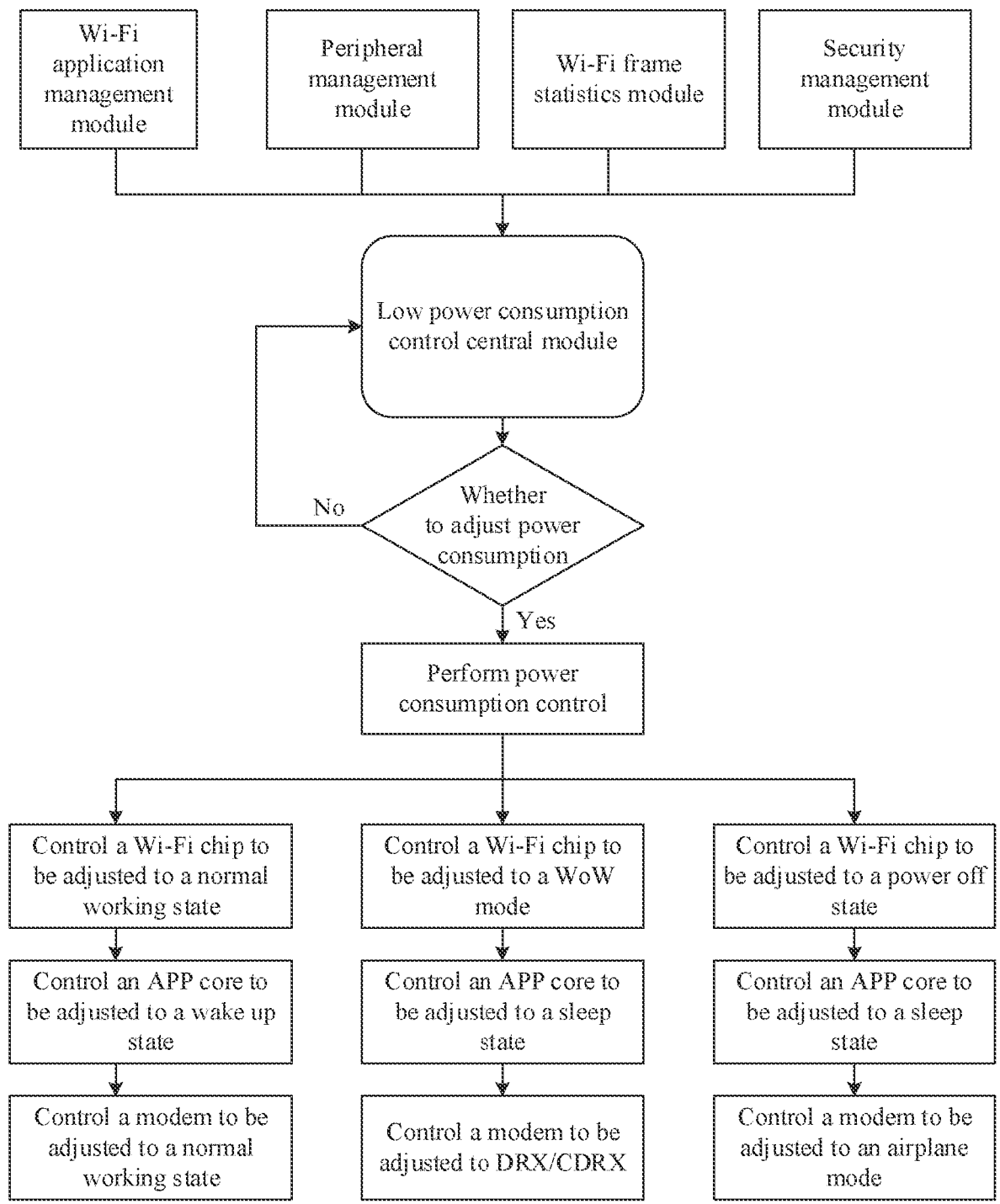
FIG. 6 is a schematic flowchart of another type of power consumption control according to an embodiment of this application.

An example is described herein based on the case shown in Table 4. A current power consumption mode of the wireless access device is the normal mode, and power consumption statuses of the APP core, the modem core, and the Wi-Fi chip are in the "working normally" state. If a target power consumption mode is the light sleep mode being different from the current power consumption mode, the low power consumption control central module controls the wireless access device to enter the light sleep mode. Referring to FIG. 6, the low power consumption control central module may control the APP core in the second component to enter the "sleep" state corresponding to the light sleep mode, control the modem core in the second component to enter the "DRX/CDRX" state corresponding to the light sleep mode, and control the Wi-Fi chip to enter the "WoW mode" corresponding to the light sleep mode. It should be noted that there is no chronological order limitation on operations performed by the low power consumption control central module for separately controlling the APP core, the modem core, and the Wi-Fi chip to enter the light sleep mode. The low power consumption control central module may simultaneously control each second component to enter the light sleep mode, or may successively control different second components to enter the light sleep mode.

Referring to FIG. 6, if a target power consumption mode is the deep sleep mode, and a current power consumption mode is different from the target power consumption mode, the low power consumption control central module may control the APP core in the second component to enter the "sleep" state corresponding to the deep sleep mode, control the modem core in the second component to enter the "offline mode" state corresponding to the deep sleep mode, and control the Wi-Fi chip to enter the "power off" state corresponding to the deep sleep mode. Similarly, there is no chronological order limitation on operations performed by the low power consumption control central module for separately controlling the APP core, the modem core, and the Wi-Fi chip to enter the deep sleep mode. The low power consumption control central module may simultaneously control each second component to enter the deep sleep mode, or may successively control different second components to enter the light sleep mode.

Referring to FIG. 6, if a target power consumption mode is the normal mode, and a current power consumption mode is different from the target power consumption mode, the low power consumption control central module may control the APP core in the second component to enter a "wake up" state corresponding to the normal mode, control the modem core in the second component to enter the "working normally" state corresponding to the normal mode, and control the Wi-Fi chip to enter the "working normally" state corresponding to the normal mode. Similarly, there is no chronological order limitation on operations performed by the low power consumption control central module for separately controlling the APP core, the modem core, and the Wi-Fi chip to enter the normal mode. The low power consumption control central module may simultaneously control each second component to enter the normal mode, or may successively control different second components to enter the normal mode.

Figure 5:
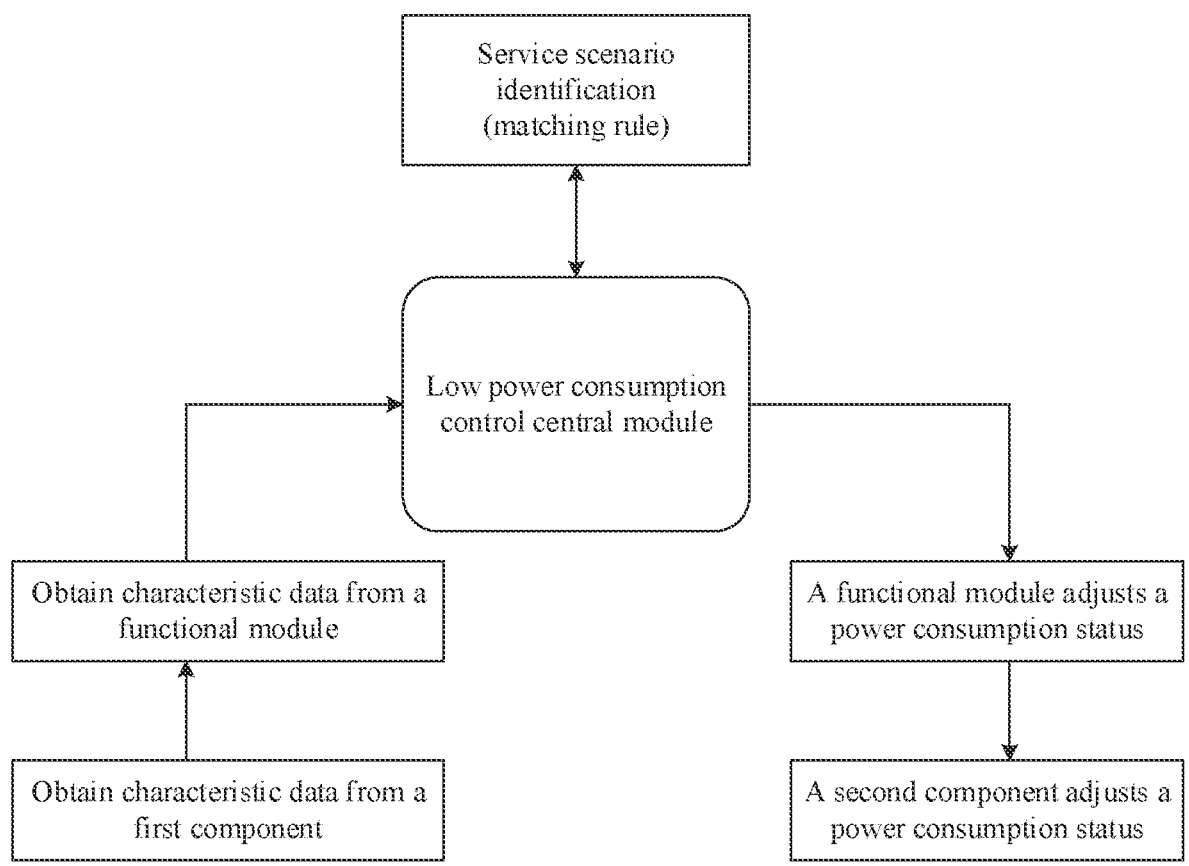
FIG. 5 is a schematic flowchart of power consumption control according to an embodiment of this application.

In an embodiment of this application, referring to FIG. 5, a low power consumption control central module may control, by using a functional module, a plurality of second components to enter a target power consumption mode, so as to adjust overall power consumption by coordinately processing of the plurality of components. For example, the low power consumption control central module may separately adjust, by using the AT server module, a power consumption status of the modem core to a power consumption status corresponding to the target power consumption mode; adjust, by using the WoW status management module, a power consumption status of the Wi-Fi chip to a power consumption status corresponding to the target power consumption mode; and adjust, by using the power consumption policy management module, a power consumption status of the APP core to a power consumption status corresponding to the target power consumption mode, so as to control the wireless access device to enter the target power consumption mode.

In some embodiments, the functional module may set, by using a device such as a register, a status parameter of a power consumption status corresponding to a target power consumption mode of the second component. The second component may be set, based on the status parameter, to a power consumption status specified by the target power consumption mode. For example, if a target power consumption mode is the light sleep mode, a status parameter set in a register of the WoW status management module may include a media access control (media access control address, MAC) address of a beacon frame, a transmission period of the beacon frame, and the like. The Wi-Fi chip may perform processing based on the status parameter set in the register, so as to enter the WoW mode corresponding to the light sleep mode.

In some embodiments, the low power consumption control central module may store the third correspondence, for example, the correspondence shown in Table 4. The low power consumption control central module may send a power consumption status (that is, the third column in Table 4) of the modem core that corresponds to a target power consumption mode in the third correspondence to the AT server module, so that the AT server module adjusts the power consumption status of the modem core. The low power consumption control central module may send a power consumption status (that is, the fourth column in Table 4) of the Wi-Fi chip that corresponds to a target power consumption mode in the third correspondence to the WoW status management module, so that the WoW status management module adjusts the power consumption status of the Wi-Fi chip. The low power consumption control central module may send a power consumption status (that is, the second column in Table 4) of the APP core that corresponds to a target power consumption mode in the third correspondence to the power consumption policy module, so that the power consumption policy module adjusts the power consumption status of the APP core.

In some other embodiments, the power consumption policy module may store the third correspondence. The low power consumption control central module may send, by querying the third correspondence in the power consumption policy module, a power consumption status of the second component that corresponds to a target power consumption mode to a functional module corresponding to each second component.

In some other embodiments, each functional module may store a power consumption status of the second component that corresponds to a target power consumption mode, and the low power consumption control central module may send the target power consumption mode to the functional module. Each functional module adjusts a power consumption status of the second component based on the power consumption status of the second component that corresponds to the stored target power consumption mode. For example, the low power consumption control central module may send the target power consumption mode "light sleep mode" to the WoW status management module. The WoW status management module determines, based on the stored correspondence, that a power consumption status of the Wi-Fi chip that corresponds to the "light sleep mode" is the "WoW mode", so that the WoW status management module adjusts the power consumption status of the Wi-Fi chip to the "WoW mode".

It should be noted that if a current power consumption mode is different from a target power consumption mode, a target power consumption status of only one or more in the plurality of second components may be different from the current power consumption status. In this case, the low power consumption control central module may only adjust the second component whose target power consumption status is different from the current power consumption status. For example, the wireless access device is in the light sleep mode shown in Table 4, a current power consumption status of the APP core is sleep, a current power consumption status of the modem core is DRX/CDRX, and a current power consumption status of the Wi-Fi chip is the WoW mode. If a target power consumption mode is the deep sleep mode, a target power consumption status of the APP core is also sleep, so the power consumption status does not need to be adjusted anymore: a target power consumption status of the modem core is the offline mode different from DRX/CDRX, so the power consumption status needs to be adjusted to the offline mode; and a target power consumption status of the Wi-Fi chip is the power off state different from the WoW mode, so the power consumption status needs to be adjusted to the power off state.

In the solution described in step 401 to step 405, the wireless access device may obtain the current characteristic data. The wireless access device may identify a refined service scenario based on current characteristic data of each component, and determine a target power consumption mode based on the service scenario. Alternatively, the wireless access device may determine a target power consumption mode based on characteristic data of each component that is used to represent a currently refined service scenario. Then, the wireless access device may adjust each component to be in a power consumption status corresponding to the target power consumption mode, so that the power consumption status of each component can be flexibly adjusted with a change of a user service scenario. Therefore, overall power consumption of the wireless access device can be effectively adjusted in time by coordinating of various components. According to the power consumption control method provided in this embodiment of this application, the power consumption status of the wireless access device can match with the current service scenario in time, so as to avoid excessive power consumption, prolong a standby time of the wireless access device, and improve user experience.

By using the power consumption control method provided in this embodiment of this application, the overall power consumption of the wireless access device can change with switching of refined scenarios. In addition, different types of power consumption of the wireless access device bring different current changes of the wireless access device. A current dynamic change curve of the wireless access device may reflect power consumption of the wireless access device. In addition, if different parameter values are set for a same component of the wireless access device, the wireless access device obtains different types of characteristic data, and the wireless access device also have different types of overall power consumption.

It should be noted that in this embodiment of this application, in addition to the large-traffic service scenario, the scenario of user access/no user access, or a large-granularity service scenario such as an application-level scenario, the wireless access device may also identify a more refined service scenario based on the characteristic data.

For example, referring to Table 5, the low power consumption control central module may determine, based on the characteristic data, that a scenario in which a user uses an e-book by using a terminal may include a loading scenario, a non-loading scenario, and the like. For example, application identity information in a data frame included in the characteristic data is represented as an e-book application. The Wi-Fi frame statistics module counts, in each time period T2 (for example, 0.05s), whether a quantity of receive/transmit data frames of the Wi-Fi chip is zero. If the low power consumption control central module learns about, based on the characteristic data, that in a preset threshold 2 (for example, 1s), a quantity of time periods in which a quantity of receive/transmit data frames of the Wi-Fi chip is zero is less than a preset value 1 (for example, 5%), the low power consumption control central module determines that a current target service scenario is the e-book loading scenario, and a corresponding target power consumption mode is the normal mode. If in a preset threshold 2, a quantity of time periods in which a quantity of receive/transmit data frames of the Wi-Fi chip is zero is greater than or equal to a preset value 2 (for example, 95%) the low power consumption control central module determines that a current target service scenario is the e-book non-loading scenario, and a corresponding target power consumption mode is the light sleep mode.

TABLE 5

| Target power consumption mode | Characteristic data | Service scenario |
| --- | --- | --- |
| Normal mode | Application identity information is represented as an e-book application, and a quantity of time periods in which a quantity of receive/transmit data frames of the Wi-Fi chip is zero is less than a preset value 1 | E-book loading scenario |
| Light sleep mode | Application identity information is represented as an e-book application, and a quantity of time periods in which a quantity of receive/transmit data frames of the Wi-Fi chip is zero is greater than a preset value 2 | E-book non-loading scenario |

As another example, the low power consumption control central module may determine, based on the characteristic data, that a scenario in which a user uses WeChat by using a terminal may include a WeChat video scenario, a WeChat non-video scenario, and the like.

In this embodiment of this application, when adjusting, according to the preset power consumption control policy rule, the second component to be with a status parameter corresponding to a target power consumption mode, in addition to adjusting an overall power consumption status of each second component, the low power consumption control central module may further finely adjust a power consumption status of a specific part in the second component.

For example, the low power consumption control central module may identify, based on the characteristic data, that a current scenario is the WeChat video scenario or the WeChat non-video scenario. Referring to Table 6, a target power consumption mode corresponding to the WeChat video scenario is a high performance normal mode, and a target power consumption mode corresponding to the WeChat non-video scenario is a low performance normal mode. As shown in Table 6, in a power consumption status corresponding to the high performance normal mode, the modem core is in a normal working state, all antennas work normally, and a 5G communication mode with a relatively high rate is used. In a power consumption status corresponding to the low performance normal mode, the modem core is in a DRX/CDRX state, some antennas are disabled, and a 3G/4G communication mode with a relatively low rate is used.

TABLE 6

Third correspondence

| Target power consumption mode | Service scenario | Power consumption status | | |
|---|---|---|---|---|
| | | APP core | Modem core | Wi-Fi chip |
| High performance normal mode | WeChat video scenario | Working normally | Work normally, all antennas work normally, and use 5G for communication | Working normally |
| Low performance normal mode | WeChat non-video scenario | Working normally | DRX/CDRX, disable some antennas, and use 3G/4G for communicate | WoW mode |

Figure 7A:
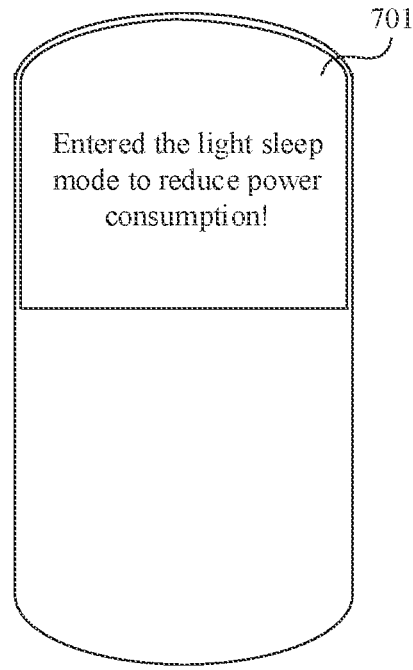
FIG. 7A is a schematic diagram of a prompt screen of a wireless access device according to an embodiment of this application.

In some other embodiments, after step 405, the wireless access device may further prompt a user that the power consumption mode is switched. For example, the wireless access device may prompt the user, by displaying information on a screen, or in a manner of a voice, a vibration, an indicator, or the like, that the power consumption mode of the wireless access device is adjusted. For example, referring to FIG. 7A, the wireless access device may display, on the screen, prompt information 701 "entered the light sleep mode to save power consumption". As another example, the wireless access device may voice the user "switched to the light sleep mode".

Figure 7B:
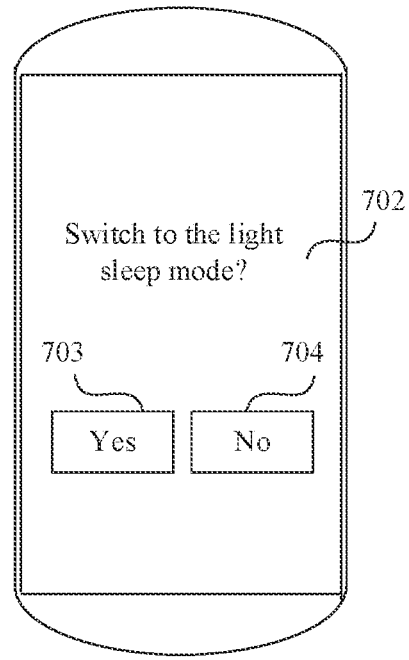
FIG. 7B is a schematic diagram of another prompt screen of a wireless access device according to an embodiment of this application.

In some other embodiments, if the wireless access device determines in step 405 that the current power consumption mode is not the target power consumption mode, the wireless access device may further query the user, by displaying information, voice, or the like, whether to switch to the target power consumption mode. Then, the wireless access device may perform further processing based on an instruction of the user. For example, referring to FIG. 7B, the wireless access device displays, on the screen, prompt information 702 "Do you want to switch to the light sleep mode?". If detecting an operation that the user clicks a "Yes" control 703 on the screen, or detecting an operation that the user presses a specific physical key on the wireless access device, the wireless access device switches to the light sleep mode. Alternatively, if detecting an operation that the user clicks a "No" control 704 on the screen, the wireless access device does not switch the power consumption mode, and continuously performs processing in the current power consumption mode.

In addition, the foregoing is described by using an example in which the plurality of second components include the APP core, the modem core, and the Wi-Fi chip. The plurality of second components may also include another component of the wireless access device such as the peripheral. That is, the low power consumption control central module may also adjust the peripheral to a power consumption status corresponding to a target power consumption mode. It may be understood that, compared with the peripheral, the APP core, the modem core, and the Wi-Fi chip have greater power consumption, and are main power-consuming components of the wireless access device. Thus, power consumption control is performed on the APP core, the modem core, and the Wi-Fi chip, so that the wireless access device benefits more greatly from power consumption control.

In some other embodiments, the power consumption control policy rule may be a personalized rule set by the user. For example, the wireless access device may be connected to a terminal such as a mobile phone or a notebook computer. The user may set a power consumption control policy rule through a setting interface displayed on the terminal device such as the mobile phone or the notebook computer, for example, set Table 2, Table 3, or Table 4. As another example, the user may set a power consumption control policy rule through a setting interface displayed on the screen of the wireless access device.

In some other embodiments, referring to Table 7, the preset power consumption control policy rule of the wireless access device may not include the target power consumption mode, but includes only a correspondence between a service scenario and a target power consumption status. The low power consumption control central module may identify a current service scenario based on the characteristic data, and determine a target power consumption status based on the current service scenario, so as to adjust a power consumption status of each component of the wireless access device to the target power consumption status. Thus, power consumption of each component and overall power consumption match the current service scenario in time, thereby reducing overall power consumption of the wireless access device.

Alternatively, referring to Table 8, the preset power consumption control policy rule of the wireless access device may not include the target power consumption mode, but only includes a correspondence between a preset condition and a target power consumption status. The low power consumption control central module may determine, based on characteristic data used to represent a current service scenario, whether a preset condition is met, so as to determine a corresponding target power consumption status of each component when the preset condition is met, and adjust a power consumption status of each component of the wireless access device to the target power consumption status. Thus, power consumption of each component and overall power consumption match the current service scenario in time, thereby reducing overall power consumption of the wireless access device.

TABLE 7

Power consumption control policy rule

| | Target power consumption status | | |
|---|---|---|---|
| Service scenario | APP core | Modem core | Wi-Fi chip |
| Online video/live broadcast viewing, a video call, a network game scenario, a high-speed download, or terminal access through a USB | Working normally | Working normally | Working normally |
| A terminal is in doze mode | Sleep | DRX/CDRX | WoW mode |
| No user access | Sleep | Airplane mode | Power off |

TABLE 8

Power consumption control policy rule

| Target power consumption status | | | Preset condition | |
|---|---|---|---|---|
| APP core | Modem core | Wi-Fi chip | Characteristic data (a status parameter or a characteristic event) | Trigger condition |
| Sleep | DRX/ CDRX | mode | Wi-Fi is in an AP mode, counting of a Wi-Fi data frame is zero, a screen is off, a USB is not accessed, a GTK refresh period does not expire, and a quantity of Wi-Fi user access is not zero | All characteristics are met and duration exceeds 10 s |
| Sleep | DRX/ CDRX | mode | A screen is off, a USB is not accessed, a GTK refresh period does not expire, and a quantity of Wi-Fi user access is zero | All characteristics are met and duration exceeds 30 s |
| Sleep | Airplane mode | Power off | A screen is off, a USB is not accessed, a GTK refresh period does not expire, and a quantity of Wi-Fi user access is zero | All characteristics are met and duration exceeds 600 s |
| Working normally | Working normally | Working normally | AUSB access event, a screen-on event, a Wi-Fi user access event, a receive/transmit data frame event, or a GTK refresh period expires | If any event occurs, switch to the normal mode |
| Working normally | Working normally | Working normally | Wi-Fi is in a non-AP mode, a screen is on, a USB is accessed, or counting of a Wi-Fi data frame is not zero | If any characteristic exists, maintain the normal mode and do not switch to another power consumption mode |

It should be noted that a target working mode, the target power consumption status, the service scenario, the characteristic data, the preset condition, and the like in the examples provided in the foregoing tables are used as examples, but do not limit the embodiments of this application.

Figure 8:
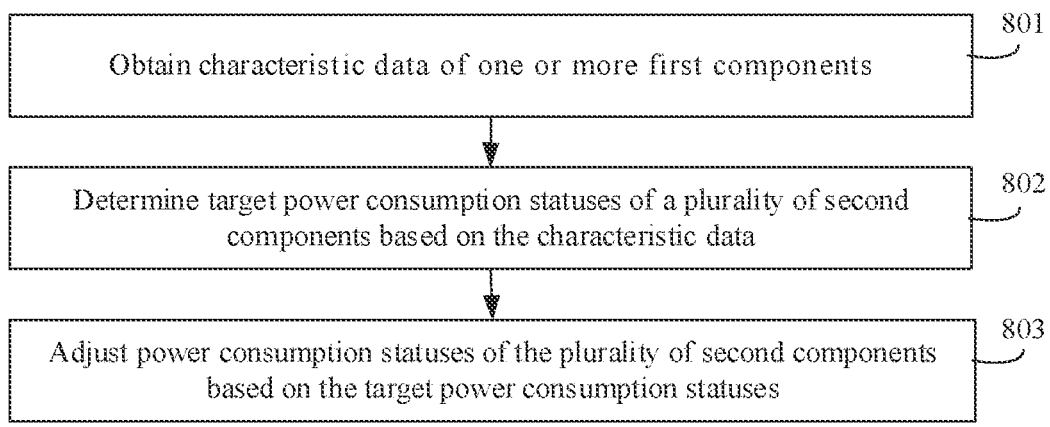
FIG. 8 is a flowchart of another power consumption control method according to an embodiment of this application.

With reference to the foregoing embodiments, another embodiment of this application provides a power consumption control method, which may be applied to the wireless access device. Referring to FIG. 8, the power consumption control method may include the following steps:

801. A wireless access device obtains characteristic data of one or more first components, where the characteristic data is used to indicate a running status of the wireless access device.

For example, the first component may be the APP core, the modem core, the Wi-Fi chip, the peripheral, or the like mentioned above.

802. The wireless access device determines target power consumption statuses of a plurality of second components based on the characteristic data.

For example, the plurality of second components may include an APP core, a modem core, and a Wi-Fi chip. For example, the wireless access device may determine the target power consumption statuses of the plurality of second components based on the characteristic data and with reference to Table 8.

803. The wireless access device adjusts power consumption statuses of the plurality of second components based on the target power consumption statuses.

The wireless access device may adjust the power consumption statuses of the plurality of second components to the target power consumption status after determining the target power consumption statuses of the plurality of second components.

In the solution described in step 801 to step 803, the wireless access device may collect current characteristic data of an internal component, and the characteristic data may be used to represent a current service scenario of a user. The wireless access device may determine target power consumption statuses of a plurality of components based on the characteristic data used to represent the service scenario, and adjust power consumption statuses of the plurality of components to the target power consumption statuses. Thus, a power consumption status of the wireless access device matches the service scenario in time by coordinately processing of various components, so as to reduce overall power consumption of the wireless access device and prolongs a standby time.

Figure 9:
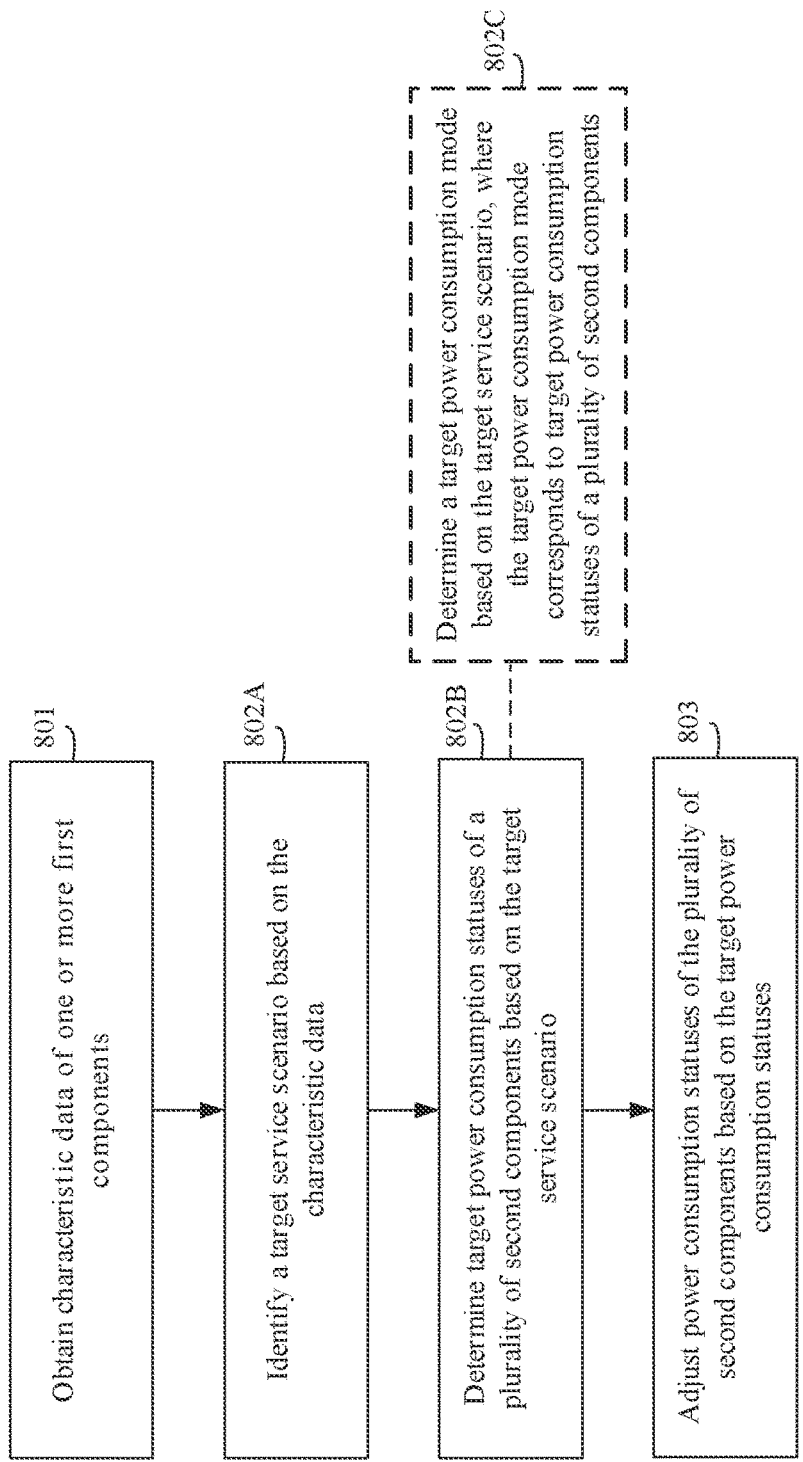
FIG. 9 is a flowchart of still another power consumption control method according to an embodiment of this application.

In some embodiments, referring to FIG. 9, step 802 may include:

802A. The wireless access device identifies a target service scenario based on the characteristic data.

Different service scenarios may correspond to different characteristic data, and different characteristic data may represent different user service scenarios. The wireless access device may determine a current target service scenario of a user based on current characteristic data.

802B. The wireless access device determines target power consumption statuses of a plurality of second components based on the target service scenario.

For example, for a correspondence between a target service scenario and a target power consumption status, refer to Table 7.

That is, the wireless access device may identify the current target service scenario of the user based on the characteristic data, so as to adjust power consumption statuses of a plurality of components of the wireless access device in time based on the target service scenario. Thus, power consumption of each component of the wireless access device and overall power consumption of the wireless access device correspond to the service scenario in time, so as to avoid excessive power consumption, and prolong a standby time of the wireless access device.

In some embodiments, referring to FIG. 9, step 802B may be replaced with:

802C. The wireless access device determines a target power consumption mode based on the target service scenario, where the target power consumption mode corresponds to target power consumption statuses of a plurality of second components.

For example, for a correspondence between a target service scenario and a target power consumption mode, refer to Table 3. For a correspondence between a target power consumption mode and target power consumption statuses of a plurality of second components, refer to Table 4.

That is, the wireless access device may identify the current target service scenario of the user based on the characteristic data, so as to determine the corresponding target power consumption mode based on the target service scenario, and then adjust the power consumption statuses of the plurality of components of the wireless access device in time to the target power consumption statuses corresponding to the target power consumption mode. Thus, power consumption of each component of the wireless access device and overall power consumption of the wireless access device correspond to the service scenario in time, so as to avoid excessive power consumption, and prolong a standby time of the wireless access device.

Figure 10:
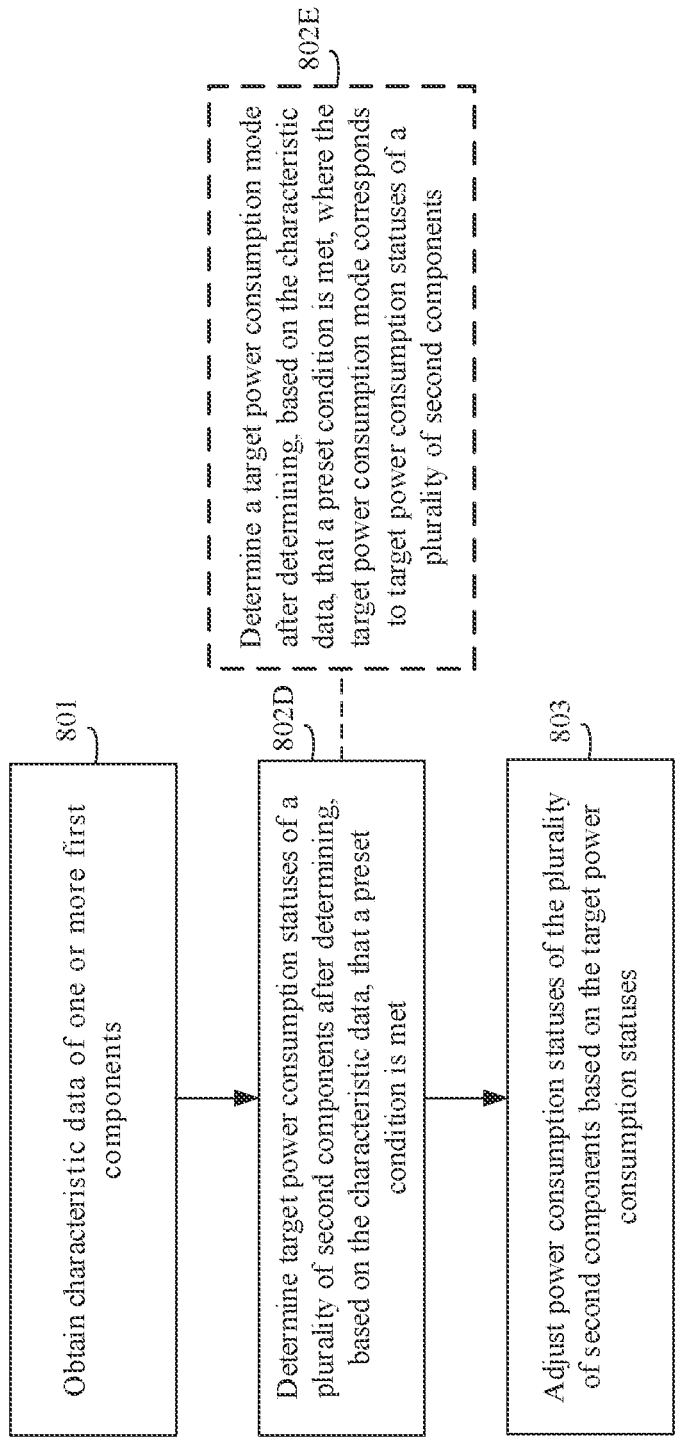
FIG. 10 is a flowchart of another power consumption control method according to an embodiment of this application.

In some other embodiments, referring to FIG. 10, step 802 may include:

802D. The wireless access device determines target power consumption statuses of a plurality of second components after determining, based on the characteristic data, that a preset condition is met.

For example, for a correspondence between a preset condition and a target power consumption status, refer to Table 8.

In some embodiments, step 802D may be replaced with:

802E. The wireless access device determines a target power consumption mode after determining, based on the characteristic data, that a preset condition is met, where the target power consumption mode corresponds to target power consumption statuses of a plurality of second components.

For example, for a correspondence between a preset condition and a target power consumption mode, refer to Table 2.

The foregoing is described by using an example in which the wireless access device adjusts the power consumption status of the wireless access device in time based on the characteristic data obtained in time and the preset power consumption control policy rule. In some other embodiments, the wireless access device may identify a current service scenario by deep learning. For example, the wireless access device may identify a current service scenario by using a deep packet inspection (deep packet inspection, DPI) technology and an artificial intelligence (artificial intelligence, AI) technology with reference to obtained characteristic data. Then, the wireless access device may adjust each component to an optimal power consumption status in time based on the service scenario, so as to accurately match the current service scenario, avoid excessive power consumption, and prolong a standby time of the wireless access device.

Figure 11:
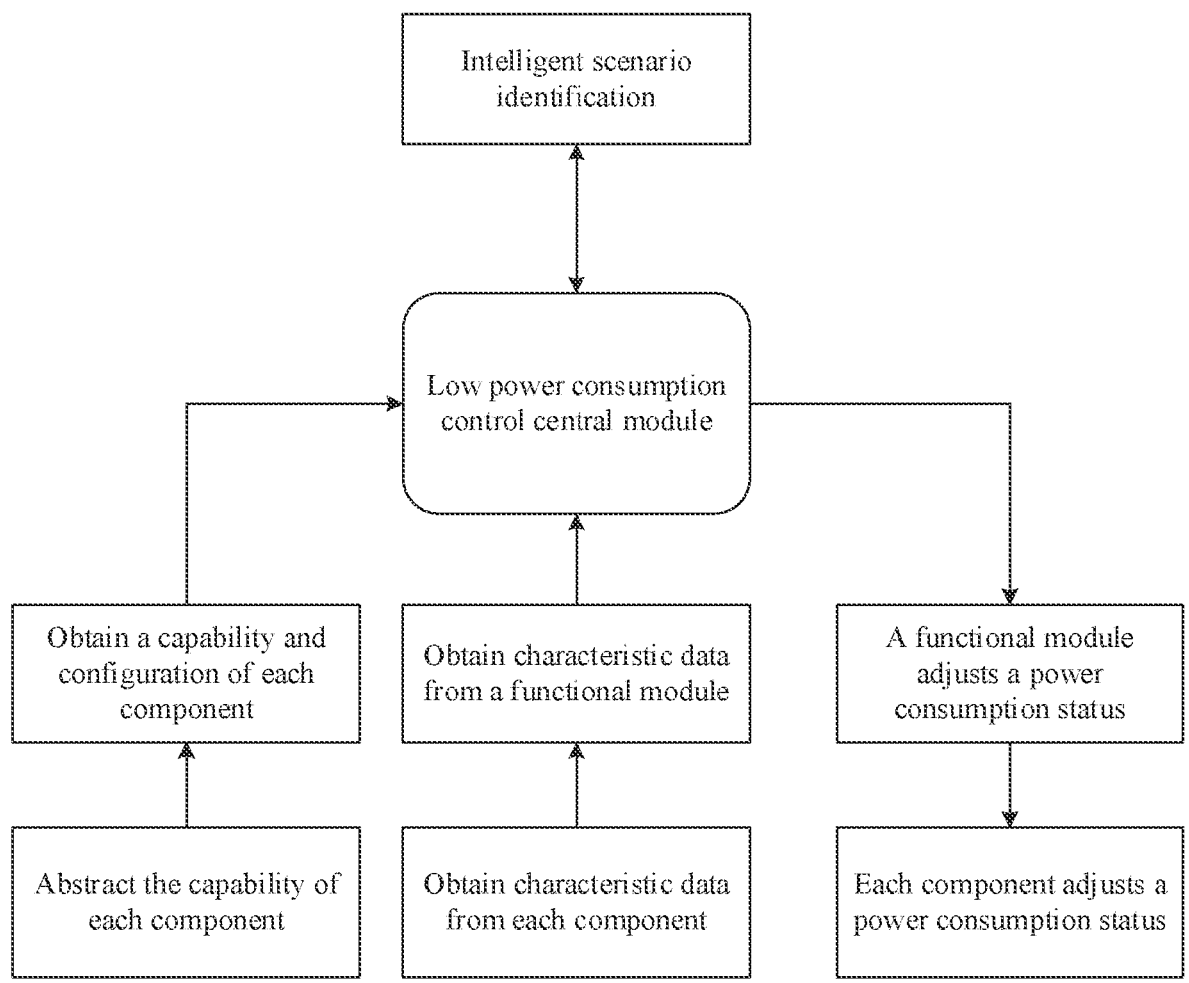
FIG. 11 is a schematic flowchart of another type of power consumption control according to an embodiment of this application.

In some embodiments, referring to an intelligent control procedure shown in FIG. 11, an abstraction processing is performed on a capability of each component of the wireless access device, and the low power consumption control central module may read a configuration file of each component, so as to obtain a processing capability and a configuration parameter of each component, and manage the capability of each component centrally. The low power consumption control central module may further obtain characteristic data of each component by using a functional module, and then intelligently identify a service scenario with reference to the DPI technology and the artificial intelligence AI technology. In addition, the low power consumption control central module may provide an optimal target power consumption status of each component in the scenario based on an AI intelligent learning process, and control and adjust each component to the target power consumption status by using a functional module. Thus, power consumption control is centrally performed on each component, so as to reduce overall power consumption of the wireless access device, and avoid excessive power consumption.

For example, the following algorithm models may be used in the AI technology: an algorithm model based on a neural network, an algorithm model based on a decision tree, an algorithm model based on a support vector machine (support vector machine, SVM), an algorithm model based on a Q table, or an algorithm model based on deep learning.

In addition, it should be noted that, by using the power consumption control method provided in this embodiment of this application, the power consumption status of each component of the wireless access device can be flexibly set, and the service scenario and the component capability are adequately matched, so that a positive electrode is coordinated to an optimal working status in each service scenario. In particular, for a scenario in which data transmission is periodically performed, the power consumption control method provided in this embodiment of this application can save a large quantity of power consumption. For example, for a scenario in which a mobile phone with screen off is connected to the wireless access device, 75% time of the wireless access device may be in a light sleep mode. Compared with a conventional technology, overall power consumption of the wireless access device may be reduced by 40% to 60%. In addition, abstraction processing is performed on a capability of each component, and each component is centrally managed and controlled, so that the wireless access device has greater expandability. If a new component is added to the wireless access device or an original component supports a new low power capability, in an architecture of the power consumption management module provided in this application, the new component or the new capability may be conveniently integrated, and the original component may also be conveniently replaced.

It should be further noted that the foregoing is described by using an example in which the electronic device is the wireless access device. When the electronic device is another type of device, the power consumption control method provided in the embodiments may also be used to reduce power consumption of the electronic device, and details are not described.

It may be understood that, to implement the foregoing functions, the electronic device includes a corresponding hardware and/or software module for performing each function. With reference to algorithm steps of each example described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that the division into modules in embodiments is an example, and is merely logical function division. During actual implementation, there may be another division manner.

Figure 12:
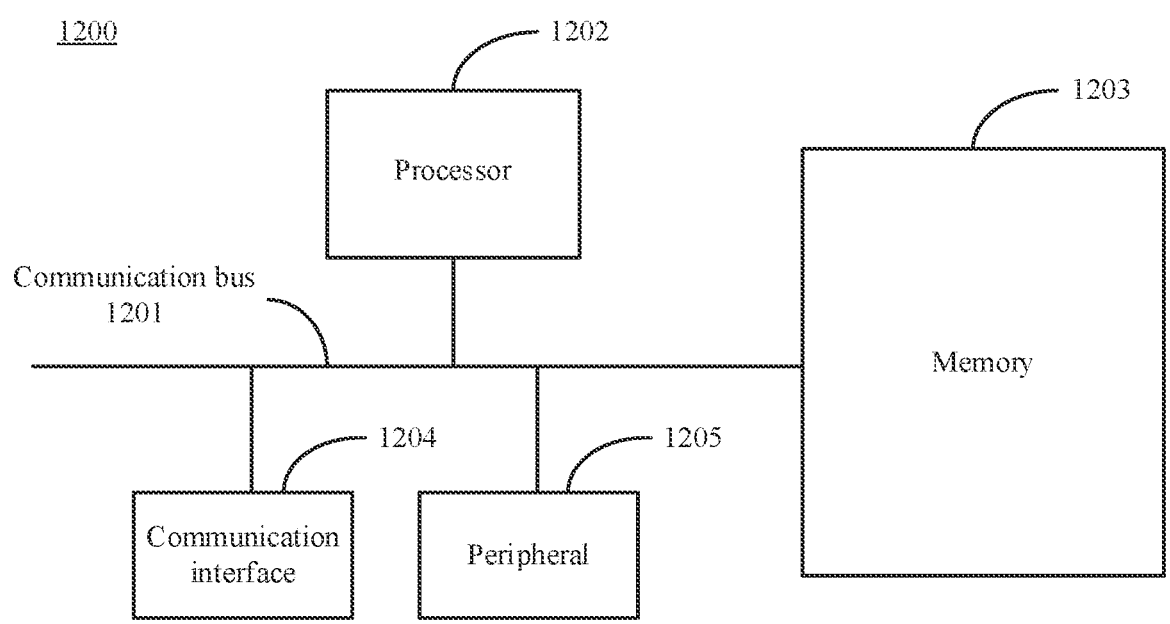
FIG. 12 is a schematic diagram of a structure of an electronic device according to an embodiment of this application.

For example, referring to FIG. 12, an embodiment of this application provides an electronic device 1200, including a communications bus 1201, and a processor 1202, a memory 1203, a communications interface 1204, and a peripheral 1205 that are connected by using the bus 1201. The communication interface 1203 may be configured to communicate with another device. The memory 1202 stores code. When the code is executed by the processor 1201, the electronic device 1200 performs the foregoing related method steps, to implement the power consumption control method in the foregoing embodiments. For example, the electronic device may be a wireless access device with a battery.

An embodiment of this application further provides a computer-readable storage medium. The computer-readable storage medium stores computer instructions. When the computer instructions are run on an electronic device, the electronic device is enabled to perform the foregoing related method steps, to implement the power consumption control method in the foregoing embodiments.

An embodiment of this application further provides a computer program product. When the computer program product runs on a computer, the computer performs the foregoing related steps, so as to implement the power consumption control method performed by the electronic device in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs the power consumption control method performed by the electronic device in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Another embodiment of this application provides a communications system, and the communications system may include the wireless access device and the at least one station device mentioned above. The wireless access device may be configured to implement the power consumption control method mentioned above.

The foregoing descriptions about implementations allow a person skilled in the art to understand that, for the purpose of convenient and brief description, division of the foregoing functional modules is used as an example for illustration. During actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed to a plurality of different places. Some or all of the units may be selected based on an actual requirement to achieve an objective of the solutions of embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in embodiments of this application. The foregoing storage medium includes any medium that can store program code, for example, a USB flash drive, a removable hard disk, a read-only memory (read only memory, ROM), a random access memory (random access memory, RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a wireless access device, wherein the method comprises:
    obtaining characteristic data of one or more first components, wherein the characteristic data indicate a running status of the wireless access device;

identifying, based on the characteristic data, a target service scenario;

selecting, based on the target service scenario, a target power consumption mode corresponding to target power consumption statuses of a plurality of second components, wherein the target power consumption statuses are based on the characteristic data and based on the target service scenario, and wherein the target power consumption mode is:

a first power consumption mode when the target service scenario is either an online video viewing scenario or an online network game scenario;

a second power consumption mode when the target service scenario is either a first scenario in which a terminal accessing the wireless access device is in a doze mode or a second scenario in which the terminal accessing the wireless access device does not have communication traffic; and a third power consumption mode when the target service scenario is a third scenario in which the wireless access device does not provide user access; and adjusting, based on the target power consumption statuses, power consumption statuses of the second components to enter the target power consumption mode.

2. The method of claim 1, wherein selecting the target power consumption mode is further based on a preset condition being met.

3. The method of claim 2, wherein the target power consumption mode is the second power consumption mode when the preset condition comprises:

a WI-FI network is in a wireless access point (AP) mode, a counting of a WI-FI data frame is zero, a screen is off, a Universal Serial Bus (USB) is not accessed, a group temporal key (GTK) refresh period is not expired, a quantity of WI-FI user access is not zero, and a duration exceeds a first preset threshold; or the screen is off, the USB is not accessed, the GTK refresh period is not expired, the quantity of WI-FI user access is zero, and the duration exceeds a second preset threshold.

4. The method of claim 3, wherein the target power consumption mode is the third power consumption mode when the preset condition comprises that the screen is off, the USB is not accessed, the GTK refresh period is not expired, the quantity of WI-FI user access is zero, and the duration exceeds a third preset threshold.

5. The method of claim 2, wherein the preset condition comprises:

a Universal Serial Bus (USB) access event, a screen-on event, a WI-FI user access event, a receive/transmit data frame event, or a group temporal key (GTK) refresh period expires; or WI-FI network is in a non-wireless access point (AP) mode, a screen is on, the USB is accessed, or counting of a WI-FI data frame is not zero.

6. The method of claim 1, wherein the second components comprise an application (APP) core, a modem core, and a WI-FI chip, and wherein according to the second power consumption mode, a first target power consumption status of the APP core is a sleep mode, a second target power consumption status of the modem core is discontinuous reception (DRX)/connection DRX (CDRX), and a third target power consumption status of the WI-FI chip is a wake on wireless local area network (WoW) mode.

7. The method of claim 1, wherein the second components comprise an application (APP) core, a modem core, and a WI-FI chip, and wherein according to the third power consumption mode, a first target power consumption status of the APP core is a sleep mode, a second target power consumption status of the modem core is an offline mode, and a third target power consumption status of the WI-FI chip is a power off mode.

8. The method of claim 1, wherein the second components comprise an application (APP) core, a modem core, and a WI-FI chip, and wherein according to the first power consumption mode, a first target power consumption status of the APP core is a normal working mode, a second target power consumption status of the modem core is the normal working mode, and a third target power consumption status of the WI-FI chip is the normal working mode.

9. The method of claim 1, wherein the one or more first components comprise an application (APP) core, a modem core, a WI-FI chip, a screen, a key, a Universal Serial Bus (USB) interface, or a sensor.

10. The method of claim 1, wherein the characteristic data comprises at least one of a working state, a quantity of access devices, a quantity of receive/transmit data frames, a traffic characteristic, a data packet characteristic, or collected data.

11. A wireless access device comprising:

a memory configured to store instructions; and a processor coupled to the memory, wherein when executed by the processor, the instructions cause the wireless access device to be configured to:

obtain characteristic data of one or more first components, wherein the characteristic data indicates a running status of the wireless access device;

identify, based on the characteristic data, a target service scenario;

select, based on the target service scenario, a target power consumption mode corresponding to target power consumption statuses of a plurality of second components, wherein the target power consumption statuses are based on the characteristic data and based on the target service scenario, and wherein the target power consumption mode is:

a first power consumption mode when the target service scenario is either an online video viewing scenario or an online network game scenario;

a second power consumption mode when the target service scenario is either a first scenario in which a terminal accessing the wireless access device is in a doze mode or a second scenario in which the terminal accessing the wireless access device does not have communication traffic; and a third power consumption mode when the target service scenario is a third scenario in which the wireless access device does not provide user access; and adjust, based on the target power consumption statuses, power consumption statuses of the second components to enter the target power consumption mode.

12. A computer program product comprising computer-executable instructions that are stored on a non-transitory computer-readable medium and that, when executed by a processor, cause a wireless access device to:

obtain characteristic data of one or more first components, wherein the characteristic data indicate a running status of the wireless access device;

identify, based on the characteristic data, a target service scenario;

select, based on the target service scenario, a target power consumption mode corresponding to target power consumption statuses of a plurality of second components, wherein the target power consumption statuses are based on the characteristic data and based on the target service scenario, and wherein the target power consumption mode is:

a first power consumption mode when the target service scenario is either an online video viewing scenario or an online network game scenario;

a second power consumption mode when the target service scenario is either a first scenario in which a terminal accessing the wireless access device is in a doze mode or a second scenario in which the terminal accessing the wireless access device does not have communication traffic; and a third power consumption mode when the target service scenario is a third scenario in which the wireless access device does not provide user access; and adjust, based on the target power consumption statuses, power consumption statuses of the second components to enter the target power consumption mode.

13. The computer program product of claim 12, wherein the second components comprise an application (APP) core, a modem core, and a WI-FI chip, and wherein according to the second power consumption mode, a first target power consumption status of the APP core is a sleep mode, a second target power consumption status of the modem core is discontinuous reception (DRX)/connection DRX (CDRX), and a third target power consumption status of the WI-FI chip is a wake on wireless local area network (WoW) mode.

14. The computer program product of claim 12, wherein the second components comprise an application (APP) core, a modem core, and a WI-FI chip, and wherein according to the third power consumption mode, a first target power consumption status of the APP core is a sleep mode, a second target power consumption status of the modem core is an offline mode, and a third target power consumption status of the WI-FI chip is a power off mode.

15. The computer program product of claim 12, wherein the second components comprise an application (APP) core, a modem core, and a WI-FI chip, and wherein according to the first power consumption mode, a first target power consumption status of the APP core is a normal working mode, a second target power consumption status of the modem core is the normal working mode, and a third target power consumption status of the WI-FI chip is the normal working mode.

16. The wireless access device of claim 11, wherein the second components comprise an application (APP) core, a modem core, and a WI-FI chip, and wherein according to the second power consumption mode, a first target power consumption status of the APP core is a sleep mode, a second target power consumption status of the modem core is discontinuous reception (DRX)/connection DRX (CDRX), and a third target power consumption status of the WI-FI chip is a wake on wireless local area network (WoW) mode.

17. The wireless access device of claim 11, wherein the second components comprise an application (APP) core, a modem core, and a WI-FI chip, and wherein according to the third power consumption mode, a first target power consumption status of the APP core is a sleep mode, a second target power consumption status of the modem core is an offline mode, and a third target power consumption status of the WI-FI chip is a power off mode.

18. The wireless access device of claim 11, wherein the second components comprise an application (APP) core, a modem core, and a WI-FI chip, and wherein according to the first power consumption mode, a first target power consumption status of the APP core is a normal working mode, a second target power consumption status of the modem core is the normal working mode, and a third target power consumption status of the WI-FI chip is the normal working mode.

19. The wireless access device of claim 11, wherein the one or more first components comprise an application (APP) core, a modem core, a WI-FI chip, a screen, a key, a Universal Serial Bus (USB) interface, or a sensor.

20. The wireless access device of claim 11, wherein the characteristic data comprises at least one of a working state, a quantity of access devices, a quantity of receive/transmit data frames, a traffic characteristic, a data packet characteristic, or collected data.

* * * * *